United States Patent
Ding et al.

(10) Patent No.: US 9,758,599 B2
(45) Date of Patent: *Sep. 12, 2017

(54) HETEROGENEOUS ZIEGLER-NATTA CATALYSTS WITH FLUORIDED SILICA-COATED ALUMINA

(71) Applicant: Chevron Phillips Chemical Company LP, The Woodlands, TX (US)

(72) Inventors: Errun Ding, Bartlesville, OK (US); Qing Yang, Bartlesville, OK (US); Lloyd W. Guatney, Bartlesville, OK (US); Jeffrey F. Greco, Tulsa, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,575

(22) Filed: Sep. 24, 2015

(65) Prior Publication Data

US 2017/0088639 A1    Mar. 30, 2017

(51) Int. Cl.
*C08F 4/6592*  (2006.01)
*C08F 4/645*   (2006.01)
*C08F 210/16*  (2006.01)

(52) U.S. Cl.
CPC ........ *C08F 4/65925* (2013.01); *C08F 4/6457* (2013.01); *C08F 210/16* (2013.01); *C08F 2410/04* (2013.01)

(58) Field of Classification Search
CPC ............................ C08F 4/65925; C08F 4/6457
See application file for complete search history.

(56) References Cited

U.S. PATENT DOCUMENTS

| | | |
|---|---|---|
| 3,242,099 A | 3/1966 | Manyik et al. |
| 3,248,179 A | 4/1966 | Norwood |
| 4,359,403 A | 11/1982 | Hoff et al. |
| 4,501,885 A | 2/1985 | Sherk et al. |
| 4,588,790 A | 5/1986 | Jenkins, III et al. |
| 4,794,096 A | 12/1988 | Ewen |
| 4,808,561 A | 2/1989 | Welborn, Jr. |
| 5,183,867 A | 2/1993 | Welborn, Jr. |
| 5,260,245 A | 11/1993 | Mink et al. |
| 5,352,749 A | 10/1994 | DeChellis et al. |
| 5,436,304 A | 7/1995 | Griffin et al. |
| 5,455,314 A | 10/1995 | Burns et al. |
| 5,488,022 A | 1/1996 | Takahashi et al. |
| 5,514,634 A | 5/1996 | Hagerty et al. |

(Continued)

FOREIGN PATENT DOCUMENTS

| | | |
|---|---|---|
| EP | 1 052 266 | 5/1999 |
| WO | 0144308 | 6/2001 |

(Continued)

OTHER PUBLICATIONS

Official Action in U.S. Appl. No. 14/863,528 dated Apr. 19, 2016, 5 pages.

(Continued)

*Primary Examiner* — Catherine S Branch
(74) *Attorney, Agent, or Firm* — Merchant & Gould P.C.

(57) ABSTRACT

Catalyst systems containing a Ziegler-Natta catalyst component are disclosed. Such catalyst systems can contain a co-catalyst and a supported catalyst containing a fluorided silica-coated alumina, a magnesium compound, and vanadium and/or tetravalent titanium.

20 Claims, 5 Drawing Sheets

(56) References Cited

U.S. PATENT DOCUMENTS

| | | | |
|---|---|---|---|
| 5,565,175 A | 10/1996 | Hottovy et al. |
| 5,575,979 A | 11/1996 | Hanson |
| 5,576,259 A | 11/1996 | Hasegawa et al. |
| 5,614,456 A | 3/1997 | Mink et al. |
| 5,739,220 A | 4/1998 | Shamshoum et al. |
| 5,747,405 A | 5/1998 | Little et al. |
| 5,767,031 A | 6/1998 | Shamshoum et al. |
| 5,807,938 A | 9/1998 | Kaneko et al. |
| 5,919,983 A | 7/1999 | Rosen |
| 6,107,230 A | 8/2000 | McDaniel et al. |
| 6,124,412 A | 9/2000 | Bin-Taleb et al. |
| 6,136,747 A | 10/2000 | Kao et al. |
| 6,165,929 A | 12/2000 | McDaniel et al. |
| 6,239,235 B1 | 5/2001 | Hottovy et al. |
| 6,262,191 B1 | 7/2001 | Hottovy et al. |
| 6,294,494 B1 | 9/2001 | McDaniel et al. |
| 6,300,271 B1 | 10/2001 | McDaniel et al. |
| 6,316,553 B1 | 11/2001 | McDaniel et al. |
| 6,355,594 B1 | 3/2002 | McDaniel et al. |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,399,531 B1 | 6/2002 | Job et al. |
| 6,524,987 B1 | 2/2003 | Collins et al. |
| 6,548,441 B1 | 4/2003 | McDaniel et al. |
| 6,548,442 B1 | 4/2003 | Collins et al. |
| 6,576,583 B1 | 6/2003 | McDaniel et al. |
| 6,613,712 B1 | 9/2003 | McDaniel et al. |
| 6,632,894 B1 | 10/2003 | McDaniel et al. |
| 6,657,026 B1 | 12/2003 | Kimberley et al. |
| 6,667,274 B1 | 12/2003 | Hawley et al. |
| 6,750,302 B1 | 6/2004 | McDaniel et al. |
| 6,833,338 B2 | 12/2004 | McDaniel et al. |
| 6,833,415 B2 | 12/2004 | Kendrick et al. |
| 6,943,134 B2 | 9/2005 | Kuo et al. |
| 6,992,032 B2 | 1/2006 | McDaniel et al. |
| 7,026,494 B1 | 4/2006 | Yang et al. |
| 7,041,617 B2 | 5/2006 | Jensen et al. |
| 7,129,302 B2 | 10/2006 | Mink et al. |
| 7,172,987 B2 | 2/2007 | Kao et al. |
| 7,199,073 B2 | 4/2007 | Martin |
| 7,199,195 B2 | 4/2007 | Barry et al. |
| 7,226,886 B2 | 6/2007 | Jayaratne et al. |
| 7,294,599 B2 | 11/2007 | Jensen et al. |
| 7,312,283 B2 | 12/2007 | Martin et al. |
| 7,390,764 B2 | 6/2008 | McDaniel et al. |
| 7,459,509 B2 | 12/2008 | Barry et al. |
| 7,517,939 B2 | 4/2009 | Yang et al. |
| 7,531,606 B2 | 5/2009 | Hendrickson |
| 7,534,842 B2 | 5/2009 | Jayaratne et al. |
| 7,547,754 B2 | 6/2009 | McDaniel et al. |
| 7,589,162 B2 | 9/2009 | Krishnaswamy et al. |
| 7,598,327 B2 | 10/2009 | Shaw |
| 7,601,665 B2 | 10/2009 | McDaniel et al. |
| 7,619,047 B2 | 11/2009 | Yang et al. |
| 7,763,561 B2 | 7/2010 | McDaniel et al. |
| 7,884,163 B2 | 2/2011 | McDaniel et al. |
| 7,919,639 B2 | 4/2011 | Murray et al. |
| 8,080,681 B2 | 12/2011 | Murray et al. |
| 8,114,946 B2 | 2/2012 | Yang et al. |
| 8,309,485 B2 | 11/2012 | Yang et al. |
| 8,318,873 B2 | 11/2012 | Jayaratne et al. |
| 8,383,754 B2 | 2/2013 | Yang et al. |
| 8,536,286 B2 | 9/2013 | Wu et al. |
| 8,546,499 B2 | 10/2013 | Garroff et al. |
| 8,623,973 B1 | 1/2014 | Mcdaniel et al. |
| 8,703,886 B1 | 4/2014 | Yang et al. |
| 8,809,219 B2 | 8/2014 | Yang et al. |
| 8,822,608 B1 | 9/2014 | Bhandarkar et al. |
| 8,916,494 B2 | 12/2014 | McDaniel et al. |
| 9,023,959 B2 | 5/2015 | McDaniel et al. |
| 9,217,049 B2 | 12/2015 | Yang et al. |
| 9,540,457 B1 | 1/2017 | Ding et al. |
| 2004/0059070 A1 | 3/2004 | Whitte |
| 2009/0048402 A1 | 2/2009 | Lynch et al. |
| 2013/0046040 A1 | 2/2013 | Srinivasan et al. |
| 2013/0131288 A1 | 5/2013 | Stevens et al. |
| 2015/0018503 A1 | 1/2015 | McDaniel et al. |
| 2017/0008984 A1 | 1/2017 | Ding et al. |
| 2017/0088646 A1 | 3/2017 | Ding et al. |

FOREIGN PATENT DOCUMENTS

| | | |
|---|---|---|
| WO | WO 01/44308 | 6/2001 |
| WO | WO 01/48029 | 7/2001 |
| WO | 2009117128 | 9/2009 |
| WO | WO 2009/117128 | 9/2009 |
| WO | WO 2010/043355 | 4/2010 |
| WO | WO 2012/034869 | 3/2012 |

OTHER PUBLICATIONS

U.S. Appl. No. 62/189,770, filed Jul. 8, 2015, entitled "Ziegler-Natta—Metallocene Dual Catalyst Systems with Activator-Supports".

U.S. Appl. No. 14/863,698, filed Sep. 24, 2015, entitled "Heterogeneous Ziegler-Natta Catalysts with Fluorided Silica-Coated Alumina".

U.S. Appl. No. 14/863,528, filed Sep. 24, 2015, entitled "Ziegler-Natta—Metallocene Dual Catalyst Systems with Activator-Supports".

U.S. Appl. No. 15/194,622, filed Jun. 28, 2016, entitled "Ziegler-Natta—Metallocene Dual Catalyst Systems with Activator-Supports".

Arnett et al., "Zero-Shear Viscosity of Some Ethyl Branched Paraffinic Model Polymers," Journal of Physical Chemistry, 1980, 84(6), pp. 649-652.

Bird et al., "Dynamics of Polymeric Liquids," vol. 1, Fluid Mechanics, 2nd Edition, John Wiley & Sons, 1987, 3 pages.

Hieber et al., "Some correlations involving the shear viscosity of polystyrene melts," Rheologica Acta, 1989, vol. 28, pp. 321-332.

Hieber et al., "Shear-Rate-Dependence Modeling of Polymer Melt Viscosity," Polymer Engineering and Science, 1992, 32(14), pp. 931-938.

Film Extrusion Manual—Process, Materials, Properties, TAPPI Press, 1992, 16 pages.

Modern Plastics Encyclopedia, Mid-Nov. 1995 Issue, vol. 72, No. 12, 3 pages.

Janzen et al., "Diagnosing long-chain branching in polyethylenes," Journal of Molecular Structure, 1999, 485-486, pp. 569-584.

Yu, et al. entitled "Long Chain Branches in Metallocene-Catalyzed Polyethylene Determined by a Combination of SEC/Multi-Angle Light Scattering, NMR and Rheology," published in *Polymer Preprints* 2003, vol. 44 (2), pp. 49-50.

International Application PCT/US2016/053054 Search Report dated Dec. 16, 2016.

International Application PCT/US2016/053054 Search Report dated Dec. 16, 2016, 5 pages.

HETEROGENEOUS ZIEGLER-NATTA CATALYSTS WITH FLUORIDED SILICA-COATED ALUMINA

BACKGROUND OF THE INVENTION

Polyolefins such as high density polyethylene (HDPE) homopolymer and linear low density polyethylene (LLDPE) copolymer can be produced using various combinations of catalyst systems and polymerization processes. In some end-use applications, it can be beneficial to use a catalyst system having a supported Ziegler-type catalyst component to produce polymers having high molecular weights and broad molecular weight distributions. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to new catalyst compositions, methods for preparing catalyst compositions, methods for using the catalyst compositions to polymerize olefins, the polymer resins produced using such catalyst compositions, and articles produced using these polymer resins. In particular, aspects of the present invention are directed to catalyst compositions containing a supported Ziegler-Natta catalyst component. One such catalyst composition can comprise (1) a supported catalyst comprising a fluorided silica-coated alumina, a magnesium compound, and titanium (IV) and/or vanadium; and (2) a co-catalyst. In some aspects, the co-catalyst can comprise an organoaluminum compound. These catalyst compositions can be used to produce, for example, ethylene-based homopolymers and copolymers for variety of end-use applications.

Processes for producing the catalyst composition also are described herein. For example, the process can comprise (i) contacting a fluorided silica-coated alumina, a magnesium compound, and a titanium (IV) compound and/or vanadium compound to form a supported catalyst; and contacting the supported catalyst and a co-catalyst to form the catalyst composition.

The present invention also contemplates and encompasses olefin polymerization processes. Such processes can comprise contacting a catalyst composition with an olefin monomer and optionally an olefin comonomer under polymerization conditions to produce an olefin polymer. Generally, the catalyst composition employed can comprise any of the supported catalysts (containing a fluorided silica-coated alumina, a magnesium compound, and titanium (IV) and/or vanadium) and any of the co-catalysts disclosed herein.

Polymers produced from the polymerization of olefins, resulting in homopolymers, copolymers, terpolymers, etc., can be used to produce various articles of manufacture. A representative and non-limiting example of an olefin polymer (e.g., an ethylene homopolymer or copolymer) consistent with aspects of this invention can be characterized as having the following properties: a melt index of less than or equal to about 2 g/10 min, a ratio of Mw/Mn in a range from about 2 to about 10, and a density in a range from about 0.90 g/cm$^3$ to about 0.96 g/cm$^3$. Another illustrative and non-limiting example of an olefin polymer of the present invention can have a melt index of less than or equal to about 1 g/10 min, a ratio of Mw/Mn in a range from about 3.5 to about 9, and a density in a range from about 0.91 g/cm$^3$ to about 0.945 g/cm$^3$. These polymers, in further aspects, can be characterized by low levels of long chain branches (LCB), and/or by a substantially constant short chain branch distribution (SCBD).

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
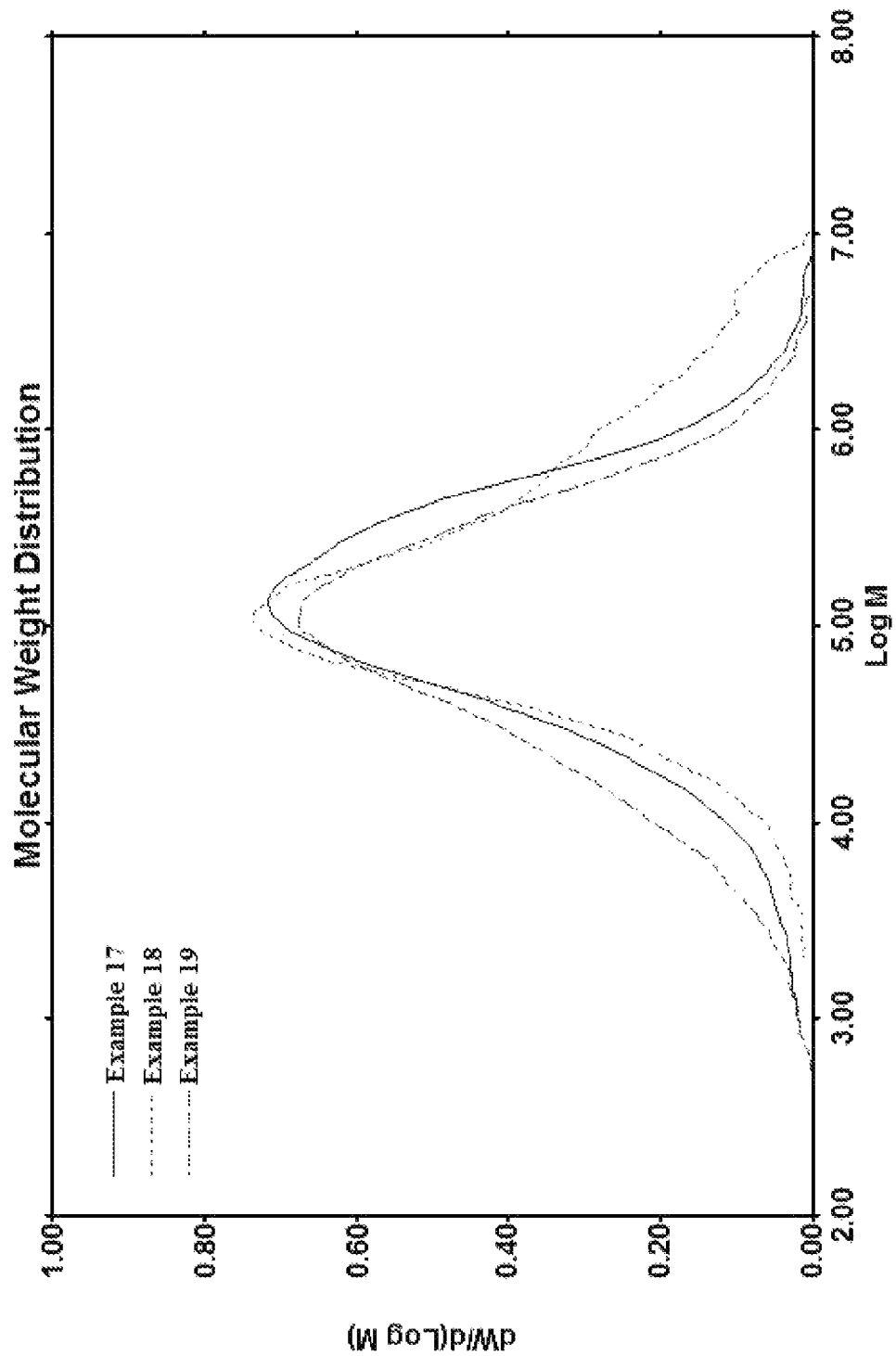
FIG. 1 presents a plot of the molecular weight distributions of the polymers of Examples 17-19.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described herein in terms of "comprising" various components or steps, the compositions and methods can also "consist essentially of" or "consist of" the various components or steps, unless stated otherwise. For example, a supported catalyst consistent with aspects of the present invention can comprise; alternatively, can consist essentially of; or alternatively, can consist of; (i) a fluorided silica-coated alumina, (ii) a magnesium compound, and (iii) titanium (IV) and/or vanadium.

The terms "a," "an," "the," etc., are intended to include plural alternatives, e.g., at least one, unless otherwise specified. For instance, the disclosure of "a co-catalyst" or "a magnesium compound" is meant to encompass one, or mixtures or combinations of more than one, co-catalyst or magnesium compound, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer.

In like manner, the scope of the term "polymerization" includes homopolymerization, copolymerization, terpolymerization, etc. Therefore, a copolymerization process can involve contacting one olefin monomer (e.g., ethylene) and one olefin comonomer (e.g., 1-hexene) to produce a copolymer.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to a fluorided silica-coated alumina. The term "co-catalyst" is used regardless of the actual function of the compound or any chemical mechanism by which the compound may operate.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic sites, or the fate of the co-catalyst, the magnesium compound, the titanium and/or vanadium component, or the fluorided silica-coated alumina, after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The term "contact product" is used herein to describe compositions wherein the components are contacted together in any order, in any manner, and for any length of time, unless otherwise specified. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise contacted in some other manner.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mw/Mn of an olefin polymer produced in an aspect of this invention. By a disclosure that the Mw/Mn can be in a range from about 2 to about 10, Applicants intend to recite that the Mw/Mn can be any ratio in the range and, for example, can be equal to about 2, about 3, about 4, about 5, about 6, about 7, about 8, about 9, or about 10. Additionally, the Mw/Mn can be within any range from about 2 to about 10 (for example, from about 3.5 to about 9), and this also includes any combination of ranges between about 2 and about 10 (for example, the Mw/Mn can be in a range from about 3 to about 6, or from about 7 to about 9). Likewise, all other ranges disclosed herein should be interpreted in a manner similar to these examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

The present invention is directed generally to new catalyst compositions, methods for preparing catalyst compositions, methods for using the catalyst compositions to polymerize olefins, the polymer resins produced using such catalyst compositions, and articles produced using these polymer resins. In particular, the present invention relates to catalyst compositions containing supported catalysts containing a fluorided silica-coated alumina, a magnesium compound, and titanium (IV) and/or vanadium, to polymerization processes utilizing such catalyst compositions, and to the resulting olefin polymers produced from the polymerization processes.

Fluorided Silica-Coated Aluminas

Fluorided silica-coated aluminas suitable for use in the present invention can include a silica-coated alumina treated with a variety of fluorine-containing compounds or fluoriding sources. Illustrative and non-limiting examples of fluorided silica-coated aluminas, silica-coated aluminas, and fluorine-containing compounds are described in U.S. Pat. Nos. 7,884,163, 8,703,886, 8,916,494, and 9,023,959, which are incorporated herein by reference in their entirety.

The silica-coated alumina solid oxide materials which can be used can have a silica content from about 5 to about 95% by weight. In one aspect, the silica content of these solid oxides can be from about 10 to about 80%, or from about 20% to about 70%, silica by weight. In another aspect, such materials can have silica contents ranging from about 15% to about 60%, or from about 25% to about 50%, silica by weight. Illustrative and non-limiting examples of silica-coated alumina materials suitable for use in this invention include Sasol SIRAL 28 (28% silica) and SIRAL 40 (40% silica), as well as those described in the examples that follow. The silica-coated alumina solid oxides and fluorided silica-coated aluminas contemplated herein can have any suitable surface area, pore volume, and particle size, as would be recognized by those of skill in the art.

The fluorided silica-coated alumina can be prepared by contacting a silica-coated alumina with a fluorine-containing compound and calcining. In some aspects, the silica-coated alumina and the fluorine-containing compound can be contacted in the vapor phase, while in other aspects, the contacting of the silica-coated alumina and the fluorine-containing compound can be conducted in the liquid phase. Moreover, the calcining can be conducted after the silica-coated alumina and the fluorine-containing compound have been contacted, or the calcining can be conducted concurrently with the contacting of the silica-coated alumina and the fluorine-containing compound (e.g., in the vapor phase).

The calcining operation can be conducted at a variety of temperatures and time periods, as described in the references noted herein. Additionally, the calcining operation can be performed in an ambient atmosphere (e.g., an oxidizing atmosphere), in a reducing atmosphere (e.g., containing molecular hydrogen and/or carbon monoxide, either individually or in a mixture with an inert gas), or in an inert atmosphere (e.g., an inert gas such as nitrogen or argon).

The fluoride source or fluorine-containing compound, in certain aspects, can comprise a Freon or a fluorocarbon compound. For instance, suitable fluorine-containing compounds can include, but are not limited to, tetrafluoromethane, trifluoromethane, difluoromethane, fluoromethane, hexafluoroethane, pentafluoroethane, pentafluorodimethyl ether, 1,1,2,2-tetrafluoroethane, 1,1,1,2-tetrafluoroethane, bis(difluoromethyl)ether, 1,1,2-trifluoroethane, 1,1,1-trifluoroethane, methyl trifluoromethyl ether, 2,2,2-trifluoroethyl methyl ether, 1,2-difluoroethane, 1,1-difluoroethane, fluoroethane, octafluoropropane, 1,1,2,2,3,3-heptafluoropropane, trifluoromethyl 1,1,2,2-tetrafluoroethyl ether, 1,1,1,2,3,3,3-heptafluoropropane, trifluoromethyl 1,2,2,2-tetrafluoroethyl ether, 1,1,1,2,2,3-hexafluoropropane, 1,1,1,2,3,3-hexafluoropropane, 1,1,1,3,3,3-hexafluoropropane, 1,2,2,2-tetrafluoroethyl difluoromethyl ether, hexafluoropropane, pentafluoropropane, 1,1,2,2,3-pentafluoropropane, 1,1,2,3,3-pentafluoropropane, 1,1,1,2,3-pentafluoropropane, 1,1,1,3,3-pentafluoropropane, methyl pentafluoroethyl ether, difluoromethyl 2,2,2-trifluoroethyl ether, difluoromethyl 1,1,2-trifluoroethyl ether, 1,1,2,2-tetrafluoropropane, methyl 1,1,2,2-tetrafluoroethyl ether, trifluoropropane, difluoropropane, fluoropropane, octafluorocyclobutane, decafluorobutane, 1,1,1,2,2,3,3,4,4-nonafluorobutane, 1,1,1,2,3,4,4,4-octafluorobutane, 1,1,1,2,2,3,3-heptafluorobutane, perfluoropropyl methyl ether, perfluoroisopropyl methyl ether, 1,1,1,3,3-pentafluorobutane, perfluorohexane (tetradecafluorohexane), tetrafluoroethylene, 1,1-difluoroethylene, fluoroethylene, hexafluoropropylene, 2,3,3,3-tetrafluoropropene, hexafluoropropene trimer, and the like, as well as combinations thereof.

In another aspect, the fluorine-containing compound can comprise (or consist essentially of, or consist of) tetrafluoromethane, trifluoromethane, difluoromethane, fluoromethane, hexafluoroethane, pentafluoroethane, tetrafluoroethane, trifluoroethane, difluorethane, octafluoropropane, perfluorohexane, perfluorobenzene, pentafluorodimethyl ether, bis (difluoromethyl)ether, methyl trifluoromethyl ether, trifluoroethyl methyl ether, perfluoroacetic anhydride, trifluoroethanol, silicon tetrafluoride ($SiF_4$), hydrogen fluoride (HF), fluorine gas ($F_2$), boron trifluoride ($BF_3$), triflic acid, tetrafluoroboric acid, antimony pentafluoride, phosphorous pentafluoride, tin tetrafluoride, thionyl fluoride, or sulfur hexafluoride, and the like, as well as mixtures or combinations thereof. For instance, the fluorine-containing compound can comprise (or consist essentially of, or consist of) tetrafluoromethane; alternatively, trifluoromethane; alternatively, difluoromethane; alternatively, fluoromethane; alternatively, hexafluoroethane; alternatively, pentafluoroethane; alternatively, tetrafluoroethane; alternatively, trifluoroethane; alternatively, difluoroethane; alternatively, octafluoropropane; alternatively, perfluorohexane; alternatively, perfluorobenzene; alternatively, pentafluorodimethyl ether; alternatively, bis(difluoromethyl)ether; alternatively, methyl trifluoromethyl ether; alternatively, trifluoroethyl methyl ether; alternatively, perfluoroacetic anhydride; alternatively, trifluoroethanol; alternatively, silicon tetrafluoride; alternatively, hydrogen fluoride; or alternatively, fluorine gas.

In yet another aspect, the fluorine-containing compound can comprise tetrafluoroethane, perfluorohexane, perfluoroacetic anhydride, and the like, or any combination thereof. In still another aspect, the fluorine-containing compound can comprise tetrafluoroethane, or alternatively, the fluorine-containing compound can comprise perfluorohexane.

In other aspects, the fluorine-containing compound can comprise hydrogen fluoride (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), $AlF_3$, $NH_4AlF_4$, triflic acid, ammonium triflate, and the like, as well as mixtures or combinations thereof. Hence, the fluorine-containing compound can comprise (or consist essentially of, or consist of) hydrogen fluoride (HF); alternatively, ammonium fluoride ($NH_4F$); alternatively, ammonium bifluoride ($NH_4HF_2$); alternatively, ammonium tetrafluoroborate ($NH_4BF_4$); alternatively, ammonium silicofluoride (hexafluorosilicate) (($NH_4)_2SiF_6$); alternatively, ammonium hexafluorophosphate ($NH_4PF_6$); alternatively, hexafluorotitanic acid ($H_2TiF_6$); alternatively, ammonium hexafluorotitanic acid (($NH_4)_2TiF_6$); alternatively, hexafluorozirconic acid ($H_2ZrF_6$); alternatively, $AlF_3$; alternatively, $NH_4AlF_4$; alternatively, triflic acid; or alternatively, ammonium triflate.

In a "vapor" phase preparation, one or more of these fluorine-containing compounds can be contacted with the silica-coated alumina during the calcining operation; for example, a suitable fluorine-containing compound can be vaporized into a gas stream used to fluidize the silica-coated alumina during calcination. In another "vapor" phase preparation, the silica-coated alumina can be exposed to a reactive fluoriding agent vapor at room temperature or slightly higher (e.g., suitable fluorine-containing compounds include HF, $BF_3$, $SiF_4$, thionyl fluoride, etc.), followed by subsequent calcining. In yet another "vapor" phase preparation, a suitable fluorine-containing compound (e.g., ammonium tetrafluoroborate, ammonium hexafluorosilicate, etc.) can be dry-mixed with the silica-coated alumina, and then heated to decompose the fluorine-containing compound, releasing fluorine-containing vapors, which react with the support. The decomposition and concurrent/subsequent calcining often can occur in the 100° C. to 700° C. range, in the 150° C. to 700° C. range, and the like. In a "liquid" phase preparation, one or more of these fluorine-containing compounds (e.g., ammonium tetrafluoroborate, ammonium hexafluorosilicate, ammonium bifluoride, hydrofluoric acid, triflic acid, etc.) can be mixed with a slurry of the silica-coated alumina in a suitable solvent (e.g., water, $C_1$-$C_3$ alcohols, etc.), followed by (drying, if desired, and) subsequent calcining Other suitable procedures are well known to those of skill in the art.

The fluorided silica-coated alumina generally can contain from about 1 to about 25 wt. % of fluorine (F), based on the weight of the fluorided silica-coated alumina. In particular aspects provided herein, the fluorided silica-coated alumina can contain from about 1 to about 20 wt. %, from about 2 to about 20 wt. %, from about 3 to about 20 wt. %, from about 2 to about 15 wt. %, from about 3 to about 15 wt. %, from about 3 to about 12 wt. %, or from about 4 to about 10 wt. %, of fluorine, based on the total weight of the fluorided silica-coated alumina.

Other suitable processes and procedures that may be applicable for preparing fluorided silica-coated aluminas for use in the present invention can be found in U.S. Pat. Nos. 7,294,599, 7,601,665, 7,884,163, 8,309,485, 8,623,973, 8,703,886, 8,916,494, and 9,023,959, which are incorporated herein by reference in their entirety.

Magnesium Compounds

Suitable magnesium compounds can include, but are not limited to, inorganic magnesium compounds, magnesium halides, magnesium alkoxides, alkoxymagnesium halides, and the like, as well as combinations thereof. For instance, the magnesium compound can comprise, either singly or in combination, $MgCl_2$, $MgBr_2$, $MgI_2$, $MgSO_4$, or $Mg(NO_3)_2$.

In an aspect, the magnesium compound can comprise a magnesium alkoxide compound, and the magnesium alkoxide can have the formula, $Mg(OR^Z)_2$. In this formula, each $R^Z$ independently can be any $C_1$ to $C_{36}$ alkyl group, $C_1$ to $C_{18}$ alkyl group, $C_1$ to $C_{12}$ alkyl group, $C_1$ to $C_{10}$ alkyl group, or $C_1$ to $C_6$ alkyl group disclosed herein. Therefore, in some aspects, the alkyl group which can be $R^Z$ can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group; or alternatively, a methyl group, an ethyl group, a propyl group, a butyl group, a pentyl group, a hexyl group, a heptyl group, an octyl group, a nonyl group, or a decyl group. In some aspects, the alkyl group which can be $R^Z$ can be a methyl group, an ethyl group, a n-propyl group, an iso-propyl group, a n-butyl group, an iso-butyl group, a sec-butyl group, a tert-butyl group, a n-pentyl group, an iso-pentyl group, a sec-pentyl group, or a neopentyl group; alternatively, a methyl group, an ethyl group, an iso-propyl group, a tert-butyl group, or a neopentyl group; alternatively, a methyl group; alternatively, an ethyl group; alternatively, a n-propyl group; alternatively, an iso-propyl group; alternatively, a tert-butyl group; or alternatively, a neopentyl group. In accordance with one aspect of this invention, each $R^Z$ is different, while in another aspect, both $R^Z$ groups are the same. In yet another aspect, the magnesium compound comprises magnesium methoxide and/or magnesium ethoxide; alternatively, magnesium methoxide; or alternatively, magnesium ethoxide.

Other magnesium compounds can be used, but in particular aspects of this invention, the magnesium compound is not a reducing agent, non-limiting examples of which include magnesium hydrocarbyl compounds such as dibutyl magnesium, cyclopentadienyl magnesium, and the like; and Grignard reagents such as butyl magnesium bromide and the like. Accordingly, such compounds (e.g., magnesium hydrocarbyl compounds) are not suitable for use as magnesium compounds in aspects of this invention.

Titanium (IV) and Vanadium Compounds

Suitable titanium (IV) compounds used in the processes for producing a catalyst disclosed herein (or suitable titanium (IV) species present on the supported catalyst) can comprise titanium halides, titanium alkoxides, alkoxytitanium halides, and the like, as well as combinations thereof. For instance, the tetravalent titanium compound or species can comprise, either singly or in combination, $TiCl_4$, $TiBr_4$, $TiI_4$, or $TiF_4$.

In an aspect, the tetravalent titanium compound or species can have the formula $Ti(OR^Z)_n X^Z_{4-n}$. In this formula, each $R^Z$ independently can be any $C_1$ to $C_{36}$ alkyl group, $C_1$ to $C_{18}$ alkyl group, $C_1$ to $C_{12}$ alkyl group, $C_1$ to $C_{10}$ alkyl group, or $C_1$ to $C_6$ alkyl group disclosed herein, $X^Z$ can be any suitable halogen, and n can be 0, 1, 2, 3, or 4. Thus, suitable titanium (IV) compounds can include, but are not limited to, $TiCl_4$, $Ti(OR^Z)Cl_3$, $Ti(OR^Z)_2Cl_2$, $Ti(OR^Z)_3Cl$, where each $R^Z$ independently can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group; or alternatively, a methyl group, an ethyl group, a propyl group, a butyl group, a pentyl group, a hexyl group, a heptyl group, an octyl group, a nonyl group, or a decyl group. In accordance with one aspect of this invention, each $R^Z$ is different, while in another aspect, each $R^Z$ group is the same. In yet another aspect, the tetravalent titanium compound comprises $TiCl_4$.

Suitable vanadium compounds used in the processes for producing a catalyst disclosed herein (or suitable vanadium species present on the supported catalyst) can comprise vanadium halides, vanadium alkoxides, alkoxyvanadium halides, and the like, as well as combinations thereof. For instance, the vanadium compound or species can comprise, either singly or in combination, $VCl_3$, $VCl_4$, ort $VOCl_3$. The vanadium compound or species can have any suitable oxidation state, such as V(+3), V(+4), or V(+5).

In an aspect, the vanadium compound or species can have the formula $V(OR^Z)_n X^Z_{4-n}$. In this formula, each $R^Z$ independently can be any $C_1$ to $C_{36}$ alkyl group, $C_1$ to $C_{18}$ alkyl group, $C_1$ to $C_{12}$ alkyl group, $C_1$ to $C_{10}$ alkyl group, or $C_1$ to $C_6$ alkyl group disclosed herein, $X^Z$ can be any suitable halogen, and n can be 0, 1, 2, 3, or 4. Thus, suitable vanadium compounds can include, but are not limited to, $VCl_4$, $V(OR^Z)Cl_3$, $V(OR^Z)_2Cl_2$, $V(OR^Z)_3Cl$, where each $R^Z$ independently can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group; or alternatively, a methyl group, an ethyl group, a propyl group, a butyl group, a pentyl group, a hexyl group, a heptyl group, an octyl group, a nonyl group, or a decyl group. In accordance with one aspect of this invention, each $R^Z$ is different, while in another aspect, each $R^Z$ group is the same. In yet another aspect, the vanadium compound comprises $VCl_3$; alternatively, $VCl_4$; or alternatively, $VOCl_3$.

Supported Catalysts

Various processes for preparing supported catalysts for use in the present invention are disclosed and described herein. One such process can comprise (or consist essentially of, or consist of) contacting (a) a fluorided silica-coated alumina, (b) a magnesium compound, and (c) a titanium (IV) compound and/or vanadium compound, to form the supported catalyst. Generally, the features of any of the processes disclosed herein (e.g., the fluorided silica-coated alumina, the magnesium compound, the tetravalent titanium compound, the vanadium compound, the order of contacting, among others) are independently disclosed herein, and these features can be combined in any combination to further describe the disclosed processes. Moreover, other process steps can be conducted before, during, and/or after any of the steps listed in the disclosed processes, unless stated otherwise. Additionally, any supported catalysts produced in accordance with the disclosed processes are within the scope of this disclosure and are encompassed herein.

In these processes, the fluorided silica-coated alumina, the magnesium compound, and the titanium (IV) compound and/or vanadium compound can be contacted or combined in any order, and under any suitable conditions, to form the supported catalyst. Thus, a variety of temperatures and time periods can be employed. For instance, the catalyst components can be contacted a temperature in a range from about 0° C. to about 100° C.; alternatively, from about 0° C. to about 75° C.; alternatively, from about 10° C. to about 90° C.; alternatively, from about 20° C. to about 60° C.; alternatively, from about 20° C. to about 50° C.; alternatively, from about 15° C. to about 45° C.; or alternatively, from about 20° C. to about 40° C. In these and other aspects, these temperature ranges also are meant to encompass circumstances where the components are contacted at a series of different temperatures, instead of at a single fixed temperature, falling within the respective ranges. As an example, the initial contacting of the components of the supported catalyst can be conducted at an elevated temperature, following by cooling to a lower temperature for longer term storage of the finished supported catalyst.

The duration of the contacting of the components to form the supported catalyst is not limited to any particular period of time. Hence, this period of time can be, for example, from as little as 1-10 seconds to as long as 24-48 hours, or more. The appropriate period of time can depend upon, for example, the contacting temperature, the respective amounts of the fluorided silica-coated alumina, the magnesium compound, and the tetravalent titanium compound (and/or vanadium compound) to be contacted or combined, the presence of diluents, the degree of mixing, and considerations for long term storage, among other variables. Generally, however, the period of time for contacting can be at least about 5 sec, at least about 10 sec, at least about 30 sec, at least about 1 min, at least about 5 min, at least about 10 min, and so forth. Assuming the supported catalyst is not intended for long term storage, which could extend for days or weeks, typical ranges for the contacting time can include, but are not limited to, from about 1 sec to about 48 hr, from about 5 sec to about 48 hr, from about 30 sec to about 24 hr, from about 1 min to about 18 hr, from about 1 min to about 6 hr, from about 5 min to about 24 hr, or from about 10 min to about 8 hr.

In one aspect of the present invention, a supported titanium catalyst can be produced, and in this aspect, a titanium (IV) compound (one or more) can be used. In another aspect, a supported vanadium catalyst can be produced, and in this aspect, a vanadium compound (one or more) can be used. In yet another aspect, a supported titanium and vanadium catalyst can be produced, and in this aspect, a titanium (IV) compound (one or more) and a vanadium compound (one or more) can be used.

Often, the fluorided silica-coated alumina, the magnesium compound, and the titanium (IV) compound and/or vanadium compound can be contacted in a solvent. The solvent can comprise, for instance, any suitable non-polar aliphatic hydrocarbon, aromatic hydrocarbon, or chlorinated hydrocarbon, and the like, or combinations thereof. Illustrative examples of non-polar aliphatic hydrocarbons can include, but are not limited to, alkanes such as cyclohexane, isobutane, n-butane, n-pentane, isopentane, neopentane, n-hexane, n-heptane, and the like, or combinations thereof. Illustrative examples of aromatic hydrocarbons can include, but are not limited to, toluene, benzene, xylene, and the like, or combinations thereof. Illustrative examples of chlorinated hydrocarbons can include, but are not limited to, chlorobenzene and the like.

In alternate aspects, the solvent can comprise any suitable polar aprotic solvent and/or any suitable Lewis base. Illustrative examples of such solvents can include, but are not limited to, ethers, pyridines, THF, substituted THF, dimethoxyethane, 1,4-dioxane, and the like, as well as combinations thereof.

In one aspect, the supported catalyst can be prepared by first contacting the fluorided silica-coated alumina and the magnesium compound in a solvent to form a mixture (e.g., a slurry), and then contacting the mixture with the titanium (IV) compound and/or vanadium compound. In another aspect, the supported catalyst can be prepared by first contacting a mixture (e.g., a solution) of the magnesium compound and the titanium (IV) compound and/or vanadium compound in a solvent, and then contacting the mixture with the fluorided silica-coated alumina. In yet another aspect, the supported catalyst can be prepared by combining the fluorided silica-coated alumina, the magnesium compound, and the titanium (IV) compound and/or vanadium compound substantially contemporaneously, and mixing to ensure sufficient contacting of all components. For each of these orders of addition, the fluorided silica-coated alumina can be present as a slurry or, alternatively, the fluorided silica-coated alumina can be present as a dry solid. Likewise, the magnesium compound and the titanium (IV) compound and/or vanadium compound can be in any suitable form, e.g., a solution, a slurry, etc.

If desired, the processes used to produce the supported catalyst can further comprise a step of filtering, and/or a step of washing, and/or a step of drying (e.g., under reduced pressure) the product resulting from contacting the fluorided silica-coated alumina, the magnesium compound, and the titanium (IV) compound and/or vanadium compound. Thus, a filtering step can be used, or a washing step can be used, or a drying step can be used, to form the supported catalyst. Alternatively, a filtering step, a washing step, and a drying step can be used to form the supported catalyst. Other suitable separation or isolation techniques known to those of skill in the art can be used to prepare the supported catalyst in various forms, such as a free-flowing solid, if desired.

In a related aspect, a supported catalyst consistent with this invention can comprise (or consist essentially of, or consist of) (a) a fluorided silica-coated alumina, (b) a magnesium compound, and (c) titanium (IV) and/or vanadium; alternatively, (a) a fluorided silica-coated alumina, (b) a magnesium compound, and (c) titanium (IV); or alternatively, (a) a fluorided silica-coated alumina, (b) a magnesium compound, and (c) vanadium. In a further aspect, a supported catalyst consistent with this invention can comprise (or consist essentially of, or consist of) (a) a fluorided silica-coated alumina, (b) a magnesium compound, and (c) a titanium (IV) compound and/or vanadium compound; alternatively, (a) a fluorided silica-coated alumina, (b) a magnesium compound, and (c) a titanium (IV) compound; or alternatively, (a) a fluorided silica-coated alumina, (b) a magnesium compound, and (c) a vanadium compound.

Consistent with aspects of this invention, the weight percentage of magnesium, based on the weight of the supported catalyst, often can be in a range from about 0.1 to about 10 wt. %. For example, the weight percentage can be in a range from about 0.25 to about 10 wt. % magnesium, from about 0.25 to about 8 wt. % magnesium, or from about 0.25 to about 5 wt. % magnesium. In specific aspects, the weight percentage of magnesium, based on the weight of the supported catalyst, can be in a range from about 0.5 to about 7 wt. %, from about 0.5 to about 5 wt. %, from about 0.5 to about 3 wt. %, from about 0.75 to about 3 wt. %, or from about 0.75 to about 2 wt. % magnesium.

Additionally or alternatively, the weight percentage of titanium (or vanadium) of the tetravalent titanium compound (or of the vanadium compound), based on the weight of the supported catalyst, often can be in a range from about 0.1 to about 10 wt. %. For example, the weight percentage can be in a range from about 0.1 to about 8 wt. %, from about 0.1 to about 5 wt. %, or from about 0.1 to about 2 wt. % titanium (or vanadium). If both titanium and vanadium are present, this weight percentage is based on the total of titanium and vanadium. In specific aspects, the weight percentage of titanium (or vanadium), based on the weight of the supported catalyst, can be in a range from about 0.2 to about 7 wt. %, from about 0.2 to about 5 wt. %, from about 0.2 to about 2 wt. %, from about 0.3 to about 2 wt. %, or from about 0.5 to about 2 wt. % titanium (or vanadium).

Further, the supported catalyst can be substantially free of Ti(III) or trivalent titanium, i.e., the supported catalyst contains less than 500 ppm by weight Ti(III). Typically, in accordance with the present invention, Ti(III) is not generated in the process to process the supported catalyst. It is contemplated that Ti(III) can be present at amounts of less than 250 ppm, less than 100 ppm, less than 50 ppm, or less than 10 ppm (by weight), in the supported catalyst in particular aspects of this invention.

In another aspect, the supported catalyst can further comprise a polar aprotic solvent, non-limiting examples of which can include ethers, pyridines, THF, substituted THF, dimethoxyethane, 1,4-dioxane, and the like, as well as combinations thereof. This solvent can be coordinated to the titanium (and/or vanadium) metal in the catalyst support, and is not a free solvent. Often, the solvent can be present at an amount in a range from about 1 to about 500 ppm, or from about 1 to about 50 ppm, based on the weight of the supported catalyst. As an example, the supported catalyst can further comprise THF at an amount in a range from about 1 to about 100 ppm, from about 1 to about 50 ppm, or from about 1 to about 10 ppm.

Co-Catalysts

In certain aspects directed to catalyst compositions containing a co-catalyst, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth. The hydrocarbyl group (or alkyl group) can be any hydrocarbyl (or alkyl) group disclosed herein. Moreover, in some aspects, the metal of the metal hydrocarbyl can be a group 1, 2, 11, 12, 13, or 14 metal; alternatively, a group 13 or 14 metal; or alternatively, a group 13 metal. Hence, in some aspects, the metal of the metal hydrocarbyl (non-halide metal hydrocarbyl or metal hydrocarbyl halide) can be lithium, sodium, potassium, rubidium, cesium, beryllium, magnesium, calcium, strontium, barium, zinc, cadmium, boron, aluminum, or tin; alternatively, lithium, sodium, potassium, magnesium, calcium, zinc, boron, aluminum, or tin; alternatively, lithium, sodium, or potassium; alternatively, magnesium or calcium; alternatively, lithium; alternatively, sodium; alternatively, potassium; alternatively, magnesium; alternatively, calcium; alternatively, zinc; alternatively, boron; alternatively, aluminum; or alternatively, tin. In some aspects, the metal hydrocarbyl or metal alkyl, with or without a halide, can comprise a lithium hydrocarbyl or alkyl, a magnesium hydrocarbyl or alkyl, a boron hydrocarbyl or alkyl, a zinc hydrocarbyl or alkyl, or an aluminum hydrocarbyl or alkyl.

In particular aspects directed to catalyst compositions containing a co-catalyst (the catalyst composition contains a fluorided silica-coated alumina), the co-catalyst can comprise an aluminoxane compound, an organoboron or organoborate compound, an ionizing ionic compound, an organo aluminum compound, an organozinc compound, an organomagnesium compound, or an organolithium compound, and this includes any combinations of these materials. In one aspect, the co-catalyst can comprise an organoaluminum compound. In another aspect, the co-catalyst can comprise an aluminoxane compound, an organoboron or organoborate compound, an ionizing ionic compound, an organozinc compound, an organomagnesium compound, an organolithium compound, or any combination thereof. In yet another aspect, the co-catalyst can comprise an aluminoxane compound; alternatively, an organoboron or organoborate compound; alternatively, an ionizing ionic compound; alternatively, an organozinc compound; alternatively, an organomagnesium compound; or alternatively, an organolithium compound.

Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentyl aluminoxane, isopentylaluminoxane, neopentylaluminoxane, and the like, or any combination thereof. Representative and non-limiting examples of organoboron/organoborate compounds include N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, tris (pentafluorophenyl)boron, tris[3,5-bis(trifluoromethyl)phenyl]boron, and the like, or mixtures thereof.

Examples of ionizing ionic compounds can include, but are not limited to, the following compounds: tri(n-butyl) ammonium tetrakis(p-tolyl)borate, tri(n-butyl) ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethyl-phenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoromethyl) phenyl] borate, triphenylcarbenium tetrakis (pentafluorophenyl)borate, tropylium tetrakis(p-tolyl) borate, tropylium tetrakis(m-tolyl)borate, tropylium tetrakis (2,4-dimethylphenyl)borate, tropylium tetrakis(3,5-dimethylphenyl)borate, tropylium tetrakis[3,5-bis(trifluoromethyl)phenyl]borate, tropylium tetrakis (pentafluorophenyl) borate, lithium tetrakis (pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis (m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, lithium tetrakis (pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis (pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl)aluminate, potassium tetrakis(2, 4-dimethylphenyl)aluminate, potassium tetrakis(3,5-dimethylphenyl)aluminate, potassium tetrafluoroaluminate, and the like, or combinations thereof.

Exemplary organozinc compounds which can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof.

Similarly, exemplary organomagnesium compounds can include, but are not limited to, dimethylmagnesium, diethylmagnesium, dipropylmagnesium, dibutylmagnesium, dineopentylmagnesium, di(trimethylsilylmethyl)magnesium, methylmagnesium chloride, ethylmagnesium chloride, propylmagnesium chloride, butylmagnesium chloride, neopentylmagnesium chloride, trimethylsilylmethylmagnesium chloride, methylmagnesium bromide, ethylmagnesium bromide, propylmagnesium bromide, butylmagnesium bromide, neopentylmagnesium bromide, trimethylsilylmethylmagnesium bromide, methylmagnesium iodide, ethylmagnesium iodide, propylmagnesium iodide, butylmagnesium iodide, neopentylmagnesium iodide, trimethylsilylmethylmagnesium iodide, methylmagnesium ethoxide, ethylmagnesium ethoxide, propylmagnesium ethoxide, butylmagnesium ethoxide, neopentylmagnesium ethoxide, trimethylsilylmethylmagnesium ethoxide, methylmagnesium propoxide, ethylmagnesium propoxide, propylmagnesium propoxide, butylmagnesium propoxide, neopentylmagnesium propoxide, trimethylsilylmethylmagnesium propoxide, methylmagnesium phenoxide, ethylmagnesium phenoxide, propylmagnesium phenoxide, butylmagnesium phenoxide, neopentylmagnesium phenoxide, trimethylsilylmethylmagnesium phenoxide, and the like, or any combinations thereof.

Likewise, exemplary organolithium compounds can include, but are not limited to, methyllithium, ethyllithium, propyllithium, butyllithium (e.g., t-butyllithium), neopentyllithium, trimethylsilylmethyllithium, phenyllithium, tolyllithium, xylyllithium, benzyllithium, (dimethylphenyl) methyllithium, allyllithium, and the like, or combinations thereof.

Co-catalysts that can be used in the catalyst compositions of this invention are not limited to the co-catalysts described above. Other suitable co-catalysts are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

Catalyst Compositions

Various processes for preparing catalyst compositions containing a supported Ziegler component are disclosed and described herein. One such process for producing a catalyst composition can comprise (or consist essentially of, or consist of) contacting a fluorided silica-coated alumina, a magnesium compound, and a titanium (IV) compound and/or vanadium compound to form a supported catalyst; and contacting the supported catalyst and a co-catalyst to form the catalyst composition.

Generally, the features of any of the processes disclosed herein (e.g., the fluorided silica-coated alumina, the magnesium compound, the titanium (IV) compound and/or vanadium compound, the supported catalyst, and the co-catalyst, among others) are independently disclosed herein, and these features can be combined in any combination to further describe the disclosed processes. Suitable fluorided silica-coated aluminas, magnesium compounds, titanium (IV) compounds and/or vanadium compounds, supported catalysts, and co-catalysts are discussed hereinabove. Moreover, other process steps can be conducted before, during, and/or after any of the steps listed in the disclosed processes, unless stated otherwise. Additionally, catalyst compositions produced in accordance with the disclosed processes are within the scope of this disclosure and are encompassed herein.

In related aspects, a catalyst composition consistent with this invention can comprise (1) a supported catalyst comprising (a) a fluorided silica-coated alumina, (b) a magnesium compound, and (c) titanium (IV) and/or vanadium; and (2) a co-catalyst. In further aspects, a catalyst composition consistent with this invention can comprise (1) a supported catalyst comprising (a) a fluorided silica-coated alumina, (b) a magnesium compound, and (c) a titanium (IV) compound and/or vanadium compound; and (2) a co-catalyst. These catalyst compositions can be utilized to produce polyolefins—homopolymers, copolymers, and the like—for a variety of end-use applications.

In these methods and catalyst compositions, the weight ratio of the co-catalyst to the supported catalyst can be in a range from about 10:1 to about 1:1000. If more than one co-catalyst and/or more than one supported catalyst are employed, this ratio is based on the total weight of each respective component. In another aspect, the weight ratio of the co-catalyst to the supported catalyst can be in a range from about 5:1 to about 1:500, from about 3:1 to about 1:100, from about 1:1 to about 1:100, or from about 1:1 to about 1:50.

The catalyst composition, in certain aspects of this invention, is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity in the absence of these additional materials. For example, a catalyst composition of the present invention can consist essentially of (1) a supported catalyst comprising (a) a fluorided silica-coated alumina, (b) a magnesium compound, and (c) titanium (IV) and/or vanadium; and (2) a co-catalyst, wherein no other materials are present in the catalyst composition which would increase/decrease the activity of the catalyst composition by more than about 10% from the catalyst activity of the catalyst composition in the absence of said materials.

However, in other aspects of this invention, these co-catalysts can be employed. For example, the co-catalyst used in the catalyst composition can comprise an aluminoxane compound, an organoboron or organoborate compound, an ionizing ionic compound, an organoaluminum compound, an organozinc compound, an organomagnesium compound, an organolithium compound, and the like, or any combination thereof.

Catalyst compositions of the present invention have unexpectedly high catalyst activity. Generally, the catalyst compositions have a catalyst activity greater than about 2,000 grams of ethylene polymer (homopolymer, copolymer, etc., as the context requires) per gram of the supported Ziegler-type catalyst (which includes the fluorided silica-coated alumina) per hour (abbreviated g/g/hr). In another aspect, the catalyst activity can be greater than about 3,000, greater than about 5,000, or greater than about 10,000 g/g/hr. In still another aspect, catalyst compositions of this invention can be characterized by having a catalyst activity greater than about 15,000, or greater than about 20,000 g/g/hr, and often can range up to 35,000-40,000 g/g/hr. These activities are measured under slurry polymerization conditions, with a triisobutylaluminum co-catalyst, using isobutane as the diluent, at a polymerization temperature of 90° C. and a reactor pressure of about 400 psig.

In further aspects, catalyst compositions—containing a co-catalyst and a supported catalyst containing fluorided silica-coated alumina, a magnesium compound, and titanium (IV) and/or vanadium—consistent with this invention can have catalyst activities that are greater than that of similar catalyst systems than do not contain fluorided silica-coated alumina, such as analogous catalyst systems containing sulfated alumina, when tested under the same conditions. Thus, the only difference is the presence of a chemically-treated solid oxide other than fluorided silica-coated alumina. Moreover, catalyst compositions of this invention can have catalyst activities that are greater than that of similar catalyst systems that contain transition metals (like Zr or Cr) instead of Ti or V, under the same testing conditions. Additionally, catalyst compositions of this invention can have catalyst activities that are greater than that of similar catalyst systems that do not contain the magnesium compound, under the same testing conditions. Catalyst activities are measured under slurry polymerization conditions, with a triisobutylaluminum co-catalyst, using isobutane as the diluent, at a polymerization temperature of 90° C. and a reactor pressure of about 400 psig.

Olefin Monomers

Unsaturated reactants that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (a), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hex ene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Generally, the amount of comonomer introduced into a polymerization reactor system to produce a copolymer can be from about 0.01 to about 50 weight percent of the comonomer based on the total weight of the monomer and comonomer. According to another aspect of the present invention, the amount of comonomer introduced into a polymerization reactor system can be from about 0.01 to about 40 weight percent comonomer based on the total weight of the monomer and comonomer. In still another aspect, the amount of comonomer introduced into a polymerization reactor system can be from about 0.1 to about 35 weight percent comonomer based on the total weight of the monomer and comonomer. Yet, in another aspect, the amount of comonomer introduced into a polymerization reactor system can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Polymerization Processes

Catalyst compositions of the present invention can be used to polymerize olefins to form homopolymers, copolymers, terpolymers, and the like. One such process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise any of the catalyst compositions described herein, and/or the catalyst composition can be produced by any of the processes for preparing catalyst compositions described herein. For instance, the catalyst composition can comprise (1) a supported catalyst comprising (a) a fluorided silica-coated alumina, (b) a magnesium compound, and (c) titanium (IV) and/or vanadium (or a titanium (IV) compound and/or vanadium compound); and (2) a co-catalyst. The components of the catalyst compositions are described herein.

The catalyst compositions of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Processes can also include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect of the invention, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under polymerization conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor system can comprise at least one gas phase reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect of the invention, a high pressure polymerization reactor can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect of the invention, the polymerization reactor system can comprise a solution polymerization reactor wherein the monomer (and comonomer, if used) are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactor systems suitable for the present invention can further comprise any combination of at least one raw material feed system, at least one feed system for catalyst or catalyst components, and/or at least one polymer recovery system. Suitable reactor systems for the present invention can further comprise systems for feedstock purification, catalyst storage and preparation, extrusion, reactor cooling, polymer recovery, fractionation, recycle, storage, loadout, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can fall within a range from about 70° C. to about 100° C., or from about 75° C. to about 95° C. Various polymerization conditions can be held substantially constant, for example, for the production of a particular grade of olefin polymer.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages.

Aspects of this invention are directed to olefin polymerization processes comprising contacting a catalyst composition with an olefin monomer and an optional olefin comonomer under polymerization conditions to produce an olefin polymer. The olefin polymer (e.g., an ethylene homopolymer or copolymer) produced by the process can have any of the polymer properties disclosed herein, for example, a melt index of less than or equal to about 2 g/10 min (or less than or equal to about 1 g/10 min), and/or ratio of Mw/Mn in a range from about 2 to about 10 (or from about 3.5 to about 9), and/or density in a range from about 0.90 g/cm$^3$ to about 0.96 g/cm$^3$ (or from about 0.91 g/cm$^3$ to about 0.945 g/cm$^3$), and/or a substantially constant short chain branch distribution (SCBD), and/or low levels of long chain branches (LCB).

Aspects of this invention also are directed to olefin polymerization processes conducted in the absence of added hydrogen. An olefin polymerization process of this invention can comprise contacting a catalyst composition (i.e., any catalyst composition disclosed herein) with an olefin monomer and optionally an olefin comonomer in a polymerization reactor system under polymerization conditions to produce an olefin polymer, wherein the polymerization process is conducted in the absence of added hydrogen (no hydrogen is added to the polymerization reactor system). As one of ordinary skill in the art would recognize, hydrogen can be generated in-situ by catalyst compositions in various olefin polymerization processes, and the amount generated can vary depending upon the specific catalyst components employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a catalyst composition (i.e., any catalyst composition disclosed herein) with an olefin monomer and optionally an olefin comonomer in a polymerization reactor system under polymerization conditions to produce an olefin polymer, wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The added hydrogen to olefin monomer ratio in the process can be controlled at a weight ratio which falls within a range from about 25 ppm to about 1500 ppm, from about 50 to about 1000 ppm, or from about 100 ppm to about 750 ppm.

In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio within a range from about 5 ppm up to about 1000 ppm or so, and maintained at the ratio to within about +/−25% during the polymerization run. For instance, if the target ratio is 100 ppm, then maintaining the hydrogen:olefin monomer ratio substantially constant would entail maintaining the feed ratio between about 75 ppm and about 125 ppm. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers (e.g., ethylene homopolymers and ethylene/α-olefin copolymers) produced by any of the polymerization processes disclosed herein. Articles of manufacture can be formed from, and/or can comprise, the polymers produced in accordance with this invention.

Polymers and Articles

Certain aspects of this invention are directed to olefin polymers, such as ethylene copolymers, that have a substantially constant short chain branch distribution (SCBD). This feature often can be referred to as a flat SCBD, or alternatively, as a uniform or homogeneous comonomer distribution. Ethylene copolymers having a uniform comonomer distribution can, for example, have less polymer swell and less solubility in solvents/diluents than copolymers with heterogeneous and non-uniform comonomer distributions, and this can be advantageous in slurry polymerization processes, particularly for lower density copolymers. Olefin polymers described herein, in certain aspects, can have a unique combination of a flat SCBD and a relatively broad molecular weight distribution, and such polymers can be produced using a supported catalyst system as disclosed herein.

Generally, olefin polymers encompassed herein can include any polymer produced from any olefin monomer and comonomer(s) described herein. For example, the olefin polymer can comprise an ethylene homopolymer, a propylene homopolymer, an ethylene copolymer (e.g., ethylene/α-olefin, ethylene/1-butene, ethylene/1-hexene, ethylene/1- octene, etc.), a propylene copolymer, an ethylene terpolymer, a propylene terpolymer, and the like, including combinations thereof. In one aspect, the olefin polymer can be an ethylene/1-butene copolymer, an ethylene/1-hexene copolymer, or an ethylene/1-octene copolymer, while in another aspect, the olefin polymer can be an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the ethylene polymers of this invention, whose typical properties are provided below.

An illustrative and non-limiting example of an olefin polymer (e.g., an ethylene copolymer) of the present invention can have a melt index of less than or equal to about 2 g/10 min, a ratio of Mw/Mn in a range from about 2 to about 10, a density in a range from about 0.90 g/cm$^3$ to about 0.96 g/cm$^3$, and optionally, a substantially constant short chain branch distribution (SCBD). Another illustrative and non-limiting example of an olefin polymer (e.g., an ethylene copolymer) of the present invention can have a melt index of less than or equal to about 1 g/10 min, a ratio of Mw/Mn in a range from about 3.5 to about 9, a density in a range from about 0.91 g/cm$^3$ to about 0.945 g/cm$^3$, and optionally, a substantially constant short chain branch distribution (SCBD). These illustrative and non-limiting examples of olefin polymers consistent with the present invention also can have any of the polymer properties listed below and in any combination.

Polymers of ethylene (homopolymers, copolymers, etc.) produced in accordance with some aspects of this invention generally can have a melt index (MI) from 0 to about 2 g/10 min. Melt indices in the range from 0 to about 1.5, from 0 to about 1, from 0 to about 0.5, or from 0 to about 0.25 g/10 min, are contemplated in other aspects of this invention. For example, a polymer of the present invention can have a MI in a range from 0 to about 0.75, or from 0 to about 0.1 g/10 min.

Consistent with certain aspects of this invention, ethylene polymers described herein can have a high load melt index (HLMI) in a range from 0 to about 100, from 0 to about 50, from 0 to about 25, or from 0 to about 10 g/10 min. In further aspects, ethylene polymers described herein can have a HLMI in a range from 0 to about 20, from 0 to about 8, or from 0 to about 3 g/10 min.

The densities of ethylene-based polymers (e.g., ethylene homopolymers, ethylene copolymers) produced using the catalyst systems and processes disclosed herein often are less than or equal to about 0.96 g/cm$^3$, for example, less than or equal to about 0.945 g/cm$^3$, and often can range down to about 0.895 g/cm$^3$. Yet, in particular aspects, the density can be in a range from about 0.90 to about 0.96, such as, for example, from about 0.90 to about 0.95, from about 0.91 to about 0.945, from about 0.91 to about 0.94, from about 0.92 to about 0.95, or from about 0.915 to about 0.935 g/cm$^3$.

Generally, polymers produced in aspects of the present invention are essentially linear or have very low levels of long chain branching, with typically less than about 0.01 long chain branches (LCB) per 1000 total carbon atoms, and similar in LCB content to polymers shown, for example, in U.S. Pat. Nos. 7,517,939, 8,114,946, and 8,383,754, which are incorporated herein by reference in their entirety. In other aspects, the number of LCB per 1000 total carbon atoms can be less than about 0.008, less than about 0.007, less than about 0.005, or less than about 0.003 LCB per 1000 total carbon atoms.

In an aspect, ethylene polymers described herein can have a ratio of Mw/Mn, or the polydispersity index, in a range from about 2 to about 10, from about 2 to about 9, from about 3 to about 10, from about 3 to about 9, or from about 3.5 to about 10. In another aspect, ethylene polymers described herein can have a Mw/Mn in a range from about 3.5 to about 9, from about 3.5 to about 8, from about 3.5 to about 7, or from about 4 to about 8.

In an aspect, ethylene polymers described herein can have a ratio of Mz/Mw in a range from about 1.5 to about 5, from about 1.5 to about 4, from about 1.5 to about 3.5, or from about 1.7 to about 5. In another aspect, ethylene polymers described herein can have a Mz/Mw in a range from about 1.7 to about 4.5, from about 1.7 to about 4, from about 2 to about 4.5, or from about 2 to about 3.5.

In an aspect, ethylene polymers described herein can have a weight-average molecular weight (Mw) in a range from about 100,000 to about 2,500,000, from about 150,000 to about 2,500,000, from about 150,000 to about 2,000,000, from about 200,000 to about 2,500,000, or from about 200,000 to about 2,000,000 g/mol. Additionally or alternatively, ethylene polymers described herein can have a number-average molecular weight (Mn) in a range from about 15,000 to about 1,000,000, from about 20,000 to about 600,000, from about 30,000 to about 500,000, or from about 40,000 to about 400,000 g/mol. Additionally or alternatively, ethylene polymers described herein can have a z-average molecular weight (Mz) in a range from about 400,000 to about 4,500,000, from about 400,000 to about 4,000,000, from about 700,000 to about 4,000,000, or from about 1,00,000 to about 3,800,000 g/mol.

Ethylene copolymers, for example, produced using the polymerization processes and catalyst systems described herein can, in some aspects, have a substantially constant SCBD. As noted above, this characteristic also may be referred to as a flat or uniform SCBD or comonomer distribution. In one aspect, the substantially constant SCBD can be described by the slope of a plot of the number of short chain branches per 1000 total carbon atoms versus the logarithm of molecular weight of the olefin polymer (and determined via linear regression over the range from D15 to D85), and the slope can be in a range from about −0.6 to about 0.6. In further aspects, the slope can be from about −0.5 to about 0.5; alternatively, from about −0.4 to about 0.4; alternatively, from about −0.3 to about 0.3; or alternatively, from about −0.2 to about 0.2. In another aspect, the substantially constant SCBD can be described by the percentage of data points deviating from the average short chain branch content of the polymer by greater than 0.5 short chain branches per 1000 total carbon atoms (determined over the range from D15 to D85), and the percentage can be less than or equal to 20%. In further aspects, this percentage can be less than or equal to 15%; alternatively, less than or equal to 10%; or alternatively, less than or equal to 5%. In yet another aspect, the substantially constant SCBD can be described by the percentage of data points deviating from the average short chain branch content of the polymer by greater than 1 short chain branch per 1000 total carbon atoms (determined over the range from D15 to D85), and the percentage can be less than or equal to 15%. In further aspects, this percentage can be less than or equal to 10%; alternatively, less than or equal to 3%; or alternatively, less than or equal to 1%.

D85 is the molecular weight at which 85% of the polymer by weight has higher molecular weight, and D15 is the molecular weight at which 15% of the polymer by weight has higher molecular weight. Hence, the substantially constant, or flat, SCBD is determined over the D85 to D15 molecular weight range.

In an aspect, the olefin polymer described herein can be a reactor product (e.g., a single reactor product), for example, not a post-reactor blend of two or more polymers, for instance, having different molecular weight characteristics. As one of skill in the art would readily recognize, physical blends of two or more different polymer resins can be made, but this necessitates additional processing and complexity not required for a reactor product.

Olefin polymers, whether homopolymers, copolymers, and so forth, can be formed into various articles of manufacture. Articles which can comprise polymers of this invention include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of ethylene copolymers described herein, and the article of manufacture can be a film product or a molded product.

Applicants also contemplate a method for forming or preparing an article of manufacture comprising a polymer produced by any of the polymerization processes disclosed herein. For instance, a method can comprise (i) contacting a catalyst composition with an olefin monomer and an optional olefin comonomer under polymerization conditions in a polymerization reactor system to produce an olefin polymer, wherein the catalyst composition can comprise a supported catalyst and a co-catalyst (e.g., an organoaluminum compound); and (ii) forming an article of manufacture comprising the olefin polymer. The forming step can comprise blending, melt processing, extruding, molding, or thermoforming, and the like, including combinations thereof.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Polymer density was determined in grams per cubic centimeter (g/cm$^3$) on a compression molded sample, cooled at about 15° C. per hour, and conditioned for about 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 400 µL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, and Mz is the z-average molecular weight.

The long chain branches (LCB) per 1000 total carbon atoms can be calculated using the method of Janzen and Colby (*J. Mol. Struct.*, 485/486, 569-584 (1999)), from values of zero shear viscosity, $\eta_o$ (determined from the Carreau-Yasuda model), and measured values of Mw obtained using a Dawn EOS multiangle light scattering detector (Wyatt). See also U.S. Pat. No. 8,114,946; J. Phys. Chem. 1980, 84, 649; and Y. Yu, D. C. Rohlfing, G. R Hawley, and P. J. DesLauriers, *Polymer Preprint*, 44, 50, (2003). These references are incorporated herein by reference in their entirety.

Short chain branch (SCB) content and short chain branching distribution (SCBD) across the molecular weight distribution can be determined via an IR5-detected GPC system (IR5-GPC), wherein the GPC system is a PL220 GPC/SEC system (Polymer Labs, an Agilent company) equipped with three Styragel HMW-6E columns (Waters, Mass.) for polymer separation. A thermoelectric-cooled IR5 MCT detector (IR5) (Polymer Char, Spain) can be connected to the GPC columns via a hot-transfer line. Chromatographic data is obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a broad MWD HDPE Marlex™ BHB5003 resin (Chevron Phillips Chemical) as the broad molecular weight standard. The digital signals, on the other hand, go via a USB cable directly to Computer "B" where they are collected by a LabView data collection software provided by Polymer Char. Chromatographic conditions are set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell are set at 150° C., while the temperature of the electronics of the IR5 detector is set at 60° C. Short chain branching content can be determined via an in-house method using the intensity ratio of $CH_3$ ($I_{CH3}$) to $CH_2$ ($I_{CH2}$) coupled with a calibration curve. The calibration curve is a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) are used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution can be obtained for resins fractionated by the IR5-GPC system under exactly the same chromatographic conditions as for these SCB standards. A relationship between the intensity ratio and the elution volume is converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Fluorided silica-coated alumina activator-supports were prepared as follows. Bohemite was obtained from W.R. Grace & Company under the designation "Alumina A" and having a surface area of about 300 m²/g, a pore volume of about 1.3 mL/g, and an average particle size of about 100 microns. The alumina was first calcined in dry air at about 600° C. for approximately 6 hours, cooled to ambient temperature, and then contacted with tetraethylorthosilicate in isopropanol to equal 25 wt. % $SiO_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina (FSCA) was collected and stored under dry nitrogen, and was used without exposure to the atmosphere.

Sulfated alumina activator-supports were prepared as follows. As above, bohemite was obtained from W.R. Grace & Company under the designation "Alumina A." This material was impregnated to incipient wetness with an aqueous solution of ammonium sulfate to equal about 15% sulfate. This mixture was then placed in a flat pan and allowed to dry under vacuum at approximately 110° C. for about 16 hours. To calcine the resultant powdered mixture, the material was fluidized in a stream of dry air at about 550° C. for about 6 hours. Afterward, the sulfated alumina (SA) was collected and stored under dry nitrogen, and was used without exposure to the atmosphere.

The structures for metallocenes MET 1, MET 2, and MET 3 are shown below:

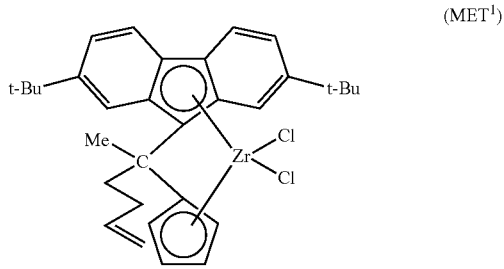

(MET¹)

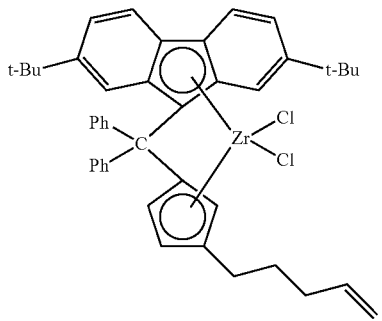

(MET²)

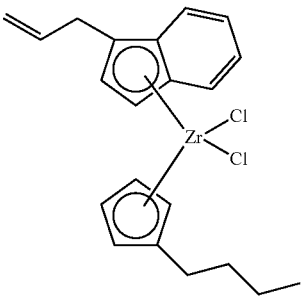

(MET³)

Examples 1-19

The supported Ziegler-type catalyst was prepared by first slurrying a sample of the fluorided silica-coated alumina in 30 mL of toluene, followed by the addition of about 12% (w/w) dibutyl magnesium, and heating to 90° C. for three hours while stirring. The white slurry was then cooled first to 21° C. and stirred for an additional eight hours, then to 0° C. Excess $TiCl_4$ was slowly added, upon which the slurry turned brown, followed by stirring at 90° C. for three hours. The slurry was filtered and the resulting red/brown solid was washed several times with heptane and dried under reduced pressure. The resulting supported catalyst contained fluorided silica-coated alumina with approximately 1 wt. % Mg and 6.2 wt. % Ti.

Examples 1-19 were produced using the following polymerization procedure (Table I summarizes certain information relating to the polymerization experiments of Examples 1-19). The polymerization runs were conducted in a one-gallon stainless steel reactor, and isobutane (1.8 L) was used in all runs. A metallocene solution of MET 1 was prepared at about 1 mg/mL in toluene. The organoaluminum (triisobutylaluminum, TIBA, 0.4 mmol), the supported Ziegler-type catalyst, and the metallocene solution (if used for a dual catalyst system, the molar ratio of the metallocene used to titanium in the supported catalyst was approximately 3:10) were added in that order through a charge port while slowly venting isobutane vapor. The charge port was closed and isobutane was added. The contents of the reactor were stirred and heated to the desired run temperature of about 90° C., and ethylene and 1-hexene (if used) were then introduced into the reactor. Hydrogen (if used) was added from a 325 cc auxiliary vessel and the pressure drop from 340 psig starting pressure, based on ethylene addition, was noted. Ethylene was fed on demand to maintain the target pressure of 390 or 450 psig pressure for the 30 minute length of the polymerization run. The reactor was maintained at the desired temperature throughout the run by an automated heating-cooling system. After venting of the reactor, purging, and cooling, the resulting polymer product was dried under reduced pressure.

In Table I, the catalyst weight is the weight of the supported catalyst (and the metallocene compound, if used), productivity is the amount of polymer produced divided by the catalyst weight, and the activity is the productivity divided by the reaction time. Examples 1-10 demonstrated that the addition of hydrogen had a negative impact on the activity of the supported catalyst, whereas Examples 11-16 demonstrated that the addition of comonomer (1-hexene) had no impact on catalyst activity. The supported catalyst produced very high molecular weight polymer, even with the introduction of significant amounts of hydrogen, which reduced the catalyst activity, but did not appreciably drop the molecular weight.

The addition of MET 1 to the supported Ziegler-type supported catalyst (i.e., a dual catalyst system) produced surprising changes in the catalyst behavior, with more responsiveness of the molecular weight (increase in MI or HLMI) to hydrogen and increasing the catalyst activity by a factor of about 2. FIG. 1 illustrates the molecular weight distributions (amount of polymer versus molecular weight) for the polymers of Examples 17-19. The polymer of Example 19, produced using a dual catalyst system (a Ziegler component and a metallocene component) in the presence of hydrogen, displayed a more substantial shift to lower molecular weight than the supported catalyst itself (Example 17), while maintaining the same broad molecular weight distribution. The polymer of Example 18, produced using the dual catalyst system with no added hydrogen exhibited a shoulder on the high molecular weight side of the distribution, and this was likely the result of the supported Ziegler-like catalyst component. Generally, the metallocene component responded to hydrogen addition, while the Ziegler component did not.

Although not tested, it was expected that the polymers of Examples 1-19 would have low levels of long chain branches (LCB), with typically less than 0.005 LCB per 1000 total carbon atoms.

Examples 20-26

Supported Ziegler-type catalysts for Examples 20-26 containing fluorided silica-coated alumina with approximately 1 wt. % Mg and 6.2 wt. % Ti were prepared as described in Examples 1-19. Examples 20-26 were produced using substantially the same polymerization procedure described in Examples 1-19 (Table II summarizes certain information relating to the polymerization experiments of Examples 20-26). TEA is triethylaluminum.

In Table II, the catalyst weight is the total weight of the supported catalyst and the metallocene compound, productivity is the amount of polymer produced divided by the catalyst weight, and the activity is the productivity divided by the reaction time. The molar ratio of the metallocene to titanium in supported catalyst was approximately 3:10. Examples 20-22 demonstrated that the addition of hydrogen had a negative impact on the activity of the dual catalyst system.

Table III summarizes the molecular weight characterization of Examples 20-23. The impact of hydrogen addition on molecular weight was evident from Examples 20-22.

Examples 27-41

Supported Ziegler-type catalysts were prepared as follows. A solution of a transition metal compound—$TiCl_4$, $ZrCl_4$, $CpTiCl_3$, $IndTiCl_3$, $V(O)Cl_3$, etc.—in THF was added to a $MgCl_2$ solution in THF at room temperature. After stirring at room temperature for 3 hours, a slurry of sulfated alumina (SA) or fluorided silica-coated alumina (FSCA) in heptane was added at room temperature. The resulting mixture was stirred at room temperature for three more hours. The solid catalyst was isolated by centrifuge, and the final supported catalyst was washed three times with heptane and dried under reduced pressure at room temperature. The resulting supported catalyst contained fluorided silica-coated alumina (or sulfated alumina) with approximately 1 wt. % Mg and 0.7 wt. % Ti (or V or Zr). No Ti(III) was present. The transition metal compound—e.g., $TiCl_4$, $V(O)Cl_3$, etc.—was present on the supported catalyst. The supported catalyst also contained about 2-4 ppm THF (by weight).

The polymers of Examples 27-41 were produced using substantially the same polymerization procedure described in Examples 1-19 (Table IV summarizes certain information relating to the polymerization experiments of Examples 27-41). Polymerization temperature was 90° C., reaction pressure was 402 psig, and the polymerization experiment was conducted for 30 min or 60 min.

Figure 2:
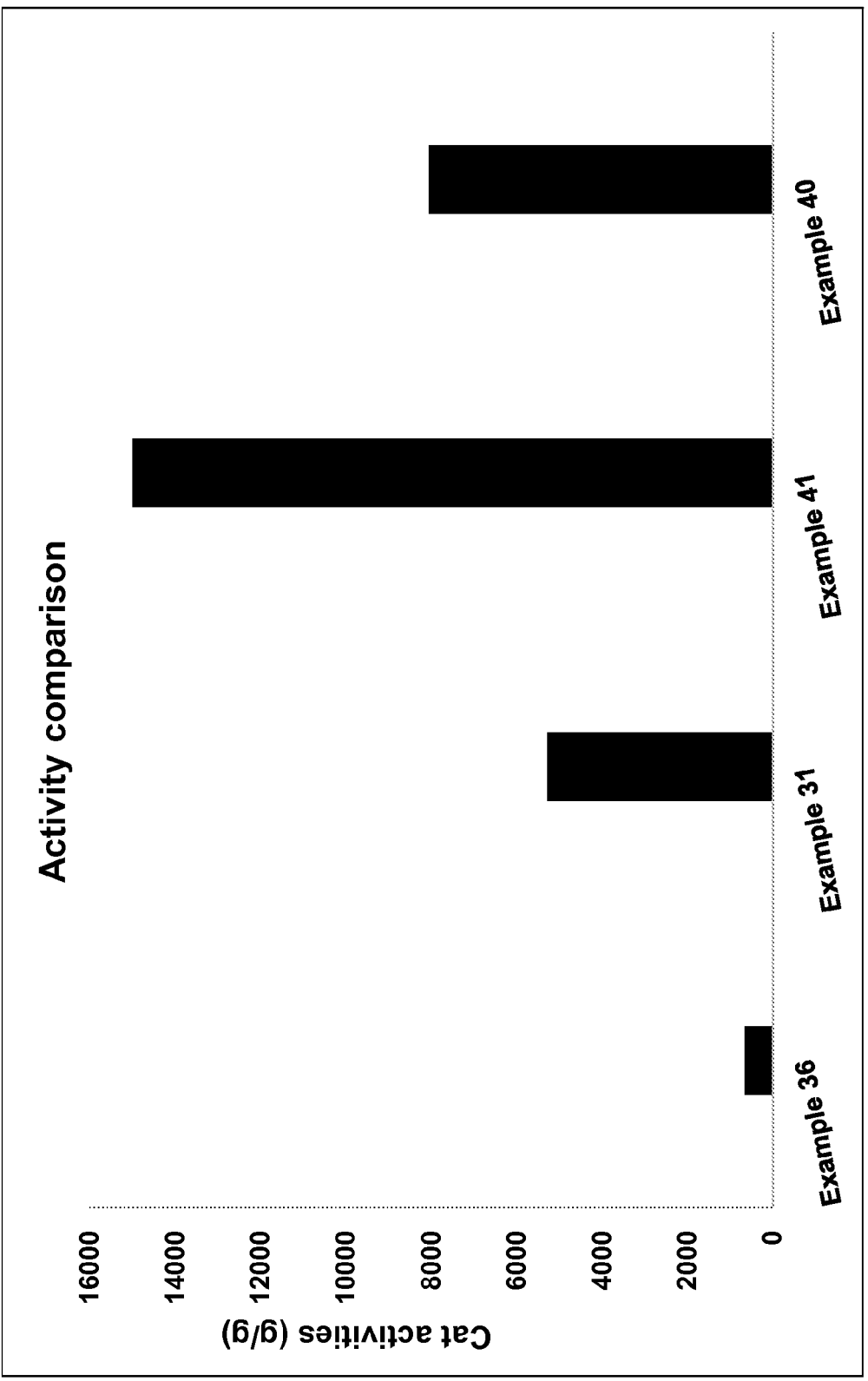
FIG. 2 presents a bar chart summarizing the catalyst activities of Examples 31, 36, and 40-41.

In Table IV, the catalyst weight is the weight of the supported catalyst and the metallocene compound (if used), and catalyst activity is the polymer produced divided by the total catalyst weight and reaction time. Importantly, Table IV demonstrates that supported catalysts that contain the FSCA with Mg and Ti (or V) have excellent catalyst activity (e.g., over 5000 g/g/hr for Examples 29 and 31, and over 2600 g/g/hr for Example 35), whereas supported catalysts that do not contain the FSCA with Mg and Ti (or V) have relatively poor catalyst activity: Example 27 had an activity of 1885 g/g/hr (sulfated alumina instead of fluorided silica-coated alumina); Examples 30 and 34 had activities of less than 200 g/g/hr (utilized Zr or Cr instead of Ti or V); Examples 36, 37, and 39 had activities of less than 1000 g/g/hr (no magnesium compound present); and Example 38 had no activity whatsoever (no Ti or V present). Example 41 demonstrates that the supported Ziegler-type catalyst can activate a metallocene component, and shows a surprising activity increase as compared to Example 40. FIG. 2 illustrates the unexpectedly high catalyst activities of Examples 31 and 41 as compared to Examples 36 and 40, respectively.

Examples 42-54

Supported Ziegler-type catalysts for Examples 42-54 containing fluorided silica-coated alumina with approximately 1 wt. % Mg and 0.6-0.8 wt. % Ti were prepared as described in Examples 27-41. No Ti(III) was present. The transition metal compound, e.g., $TiCl_4$, was present on the supported catalyst. The supported catalyst also contained about 2-4 ppm THF (by weight).

Examples 42-54 were produced using substantially the same polymerization procedure described in Examples 1-19, but with varying levels of 1-hexene comonomer and hydrogen addition, generally producing polymers with high molecular weights and broad molecular weight distributions. Table V summarizes the molecular weight characterization of Examples 42-54. Although not tested, it was expected that the polymers produced using the supported Ziegler catalyst would have substantially flat short chain branching distributions.

Examples 55-83

Supported Ziegler-type catalysts for Examples 55-82 containing fluorided silica-coated alumina with approximately 1.1 wt. % Mg and 0.7 wt. % Ti were prepared as described in Examples 27-41. No Ti(III) was present. The transition metal compound—e.g., $TiCl_4$, $V(O)Cl_3$, etc.—was present on the supported catalyst. The supported catalyst also contained about 2-4 ppm THF (by weight).

Dual catalyst Examples 55-82 were produced using substantially the same polymerization procedure described in Examples 1-19, but with varying levels of 1-hexene comonomer and hydrogen addition at 90° C. and 400 psig. The molar ratio of the metallocene to titanium in the supported catalyst was approximately 1:10.

Figure 3:
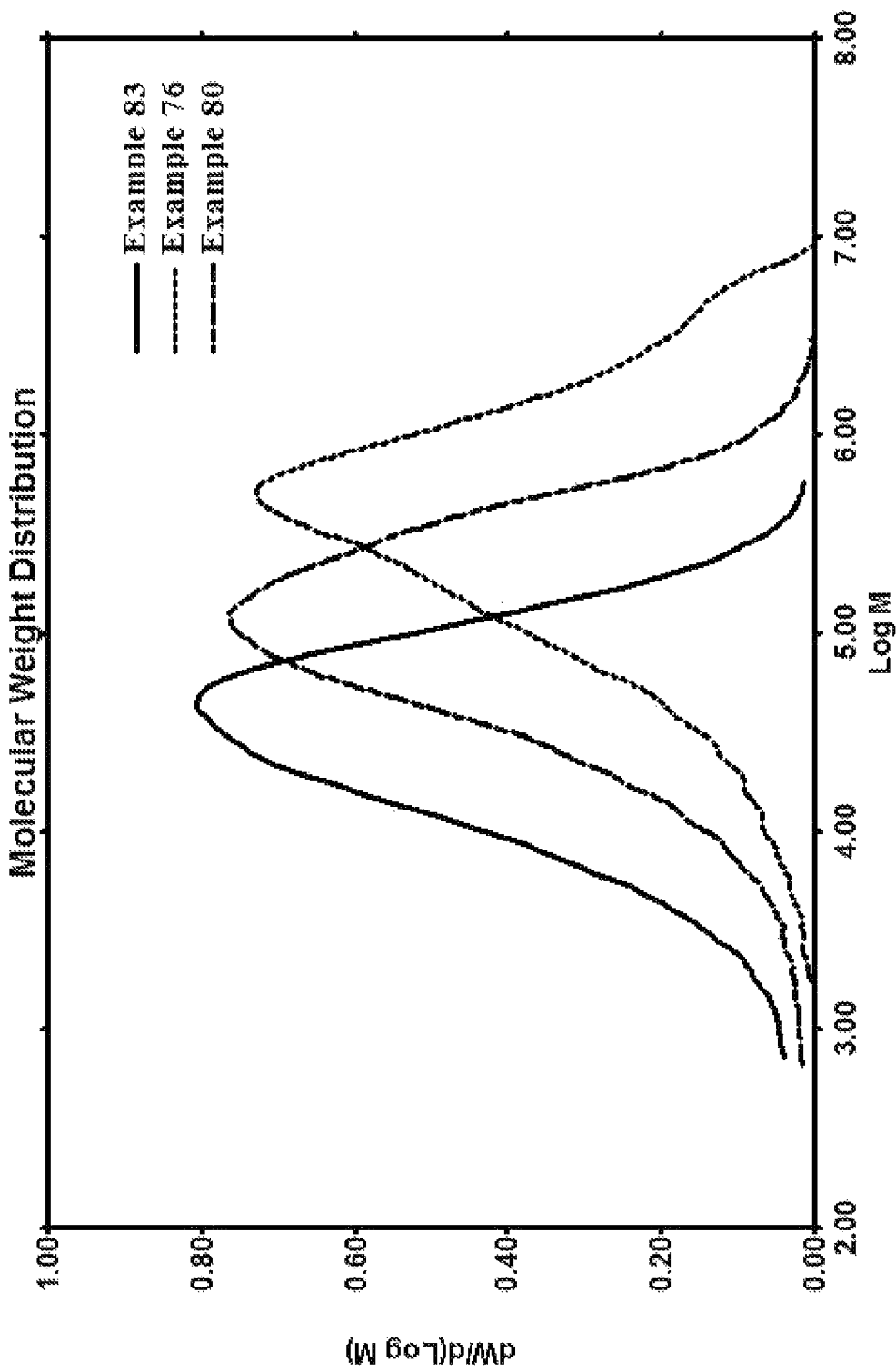
FIG. 3 presents a plot of the molecular weight distributions of the polymers of Examples 76, 80, and 83.

Table VI summarizes the molecular weight characterization of Examples 55-83, and demonstrates a wide range of polymer weights (generally high molecular weights and broad molecular weight distributions) that can be produced with different metallocene compounds and dual catalyst systems. FIG. 3 illustrates the molecular weight distributions of the polymers of Examples 76, 80, and 83. Although not tested, it was expected that the polymers of Examples 55-82 would have low levels of long chain branches (LCB), with typically less than 0.005 LCB per 1000 total carbon atoms, and substantially flat short chain branching distributions.

Example 84

The supported Ziegler-type catalyst was prepared by first preparing $Mg(OEt)_2$ (magnesium ethoxide). $MgCl_2$ (0.146 g) was mixed with chlorobenzene (100 mL), then anhydrous ethanol (0.4563 g) was added, and the mixture was refluxed at 145° C. for 1.5 hours, resulting in $Mg(OEt)_2$ (magnesium ethoxide). The solution was removed from heat and allowed to cool to below the reflux temperature, followed by the addition of a toluene slurry of the fluorided silica-coated alumina (1.81 g). The reaction mixture was returned to reflux and stirred for 20 minutes, then cooled to 0° C., and $TiCl_4$ (4.046 g) was added. The mixture was heated back to reflux for 2 hours and allowed to slowly cool to 21° C. while stirring for eight hours. The slurry was filtered and the resulting grey/brown solid was washed several times with heptane and dried under reduced pressure. The resulting supported catalyst contained fluorided silica-coated alumina with approximately 2 wt. % Mg and 7 wt. % Ti, of which none was Ti(III).

Figure 4:
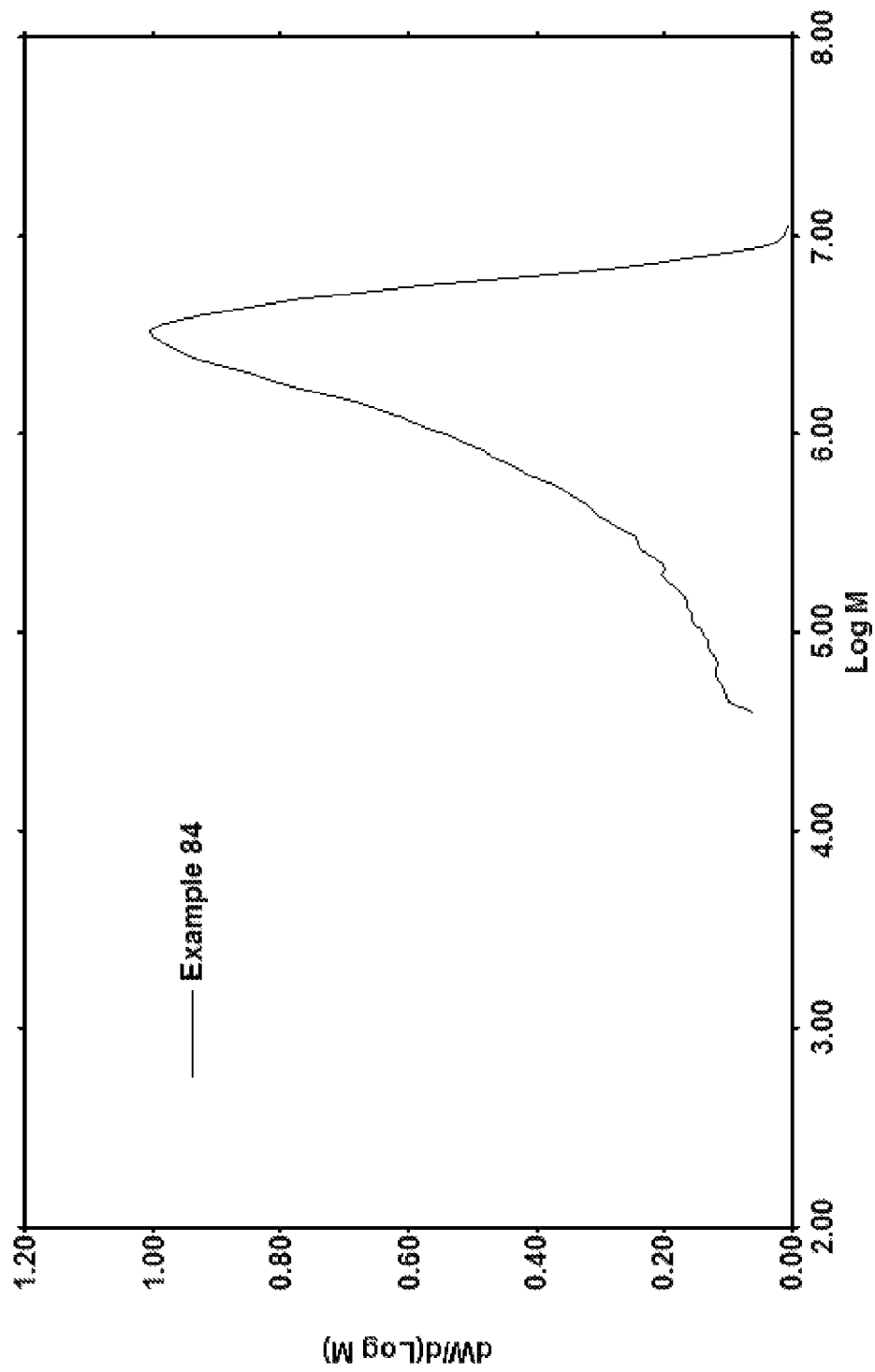
FIG. 4 presents a plot of the molecular weight distribution of the polymer of Example 84.

Example 84 was produced using substantially the same procedure described in Examples 1-19, specifically for 30 min at 90° C. and 390 psig, with no hydrogen and comonomer. The weight of the supported catalyst was 4 mg. FIG. 4 illustrates the molecular weight distribution (amount of polymer versus molecular weight) for the polymer of Example 84: the Mn was 528,000 g/mol, the Mw was 2,142,000 g/mol, the Mz was 3,635,000 g/mol, the Mp was 3,195,000 g/mol, and the ratio of Mw/Mn was 4.06.

Examples 85-92

Supported Ziegler-type catalysts for Examples 85-92 containing fluorided silica-coated alumina with approximately 2 wt. % Mg and 7 wt. % Ti (and no Ti(III)) were prepared as described in Example 84. Examples 85-92 were produced using substantially the same polymerization procedure described in Examples 1-19 (Table VII summarizes certain information relating to the polymerization experiments of Examples 85-92).

In Table VII, the catalyst weight is the total weight of the supported catalyst and the metallocene compound (and FSCA, if used), productivity is the amount of polymer produced divided by the catalyst weight, and the activity is the productivity divided by the reaction time. The molar ratio of the metallocene to titanium in supported catalyst was approximately 3:10. Examples 89-90 utilized catalyst systems containing a supported Ziegler-type catalyst, a metallocene, and fluorided silica-coated alumina (FSCA).

Figure 5:
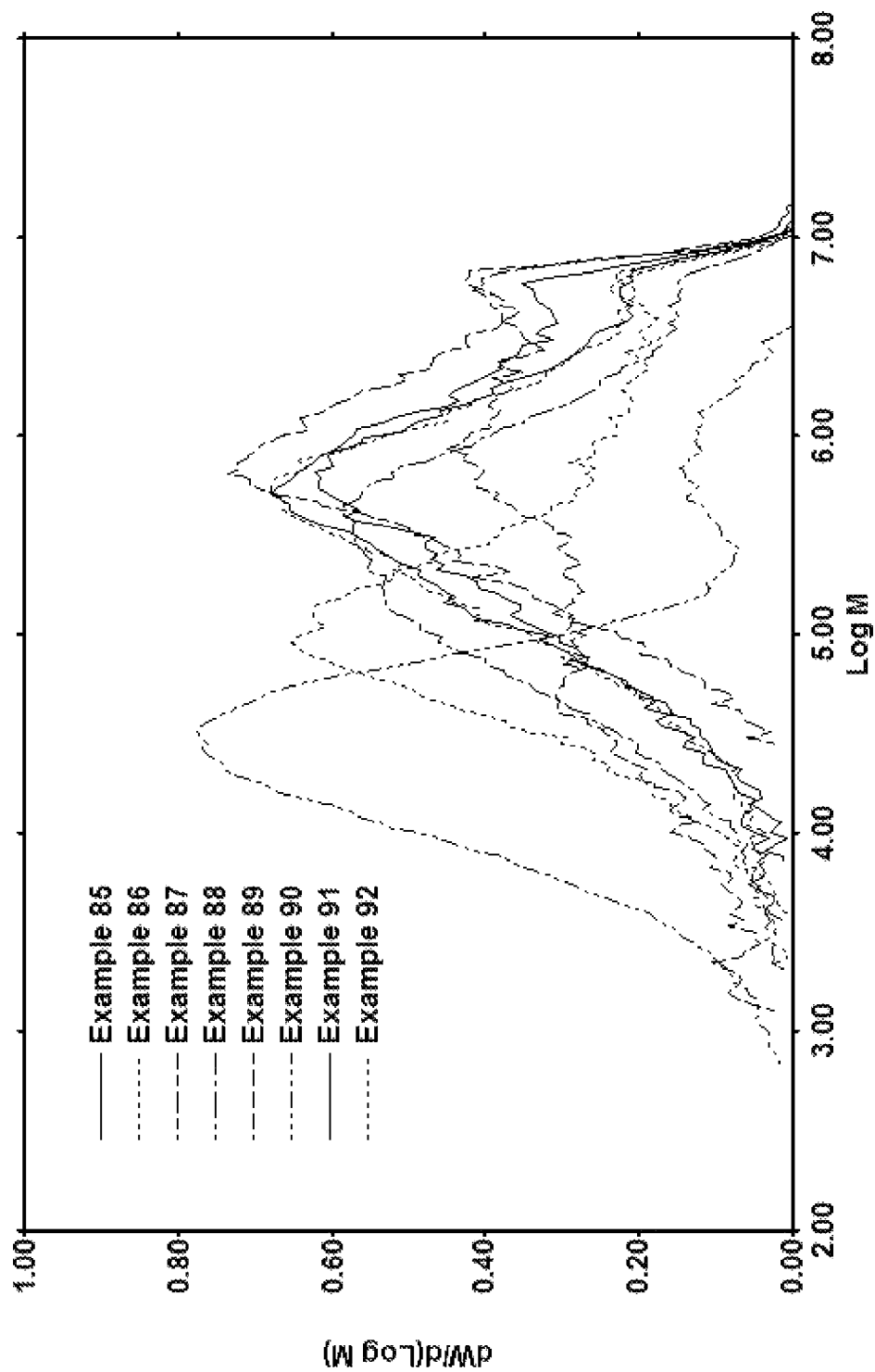
FIG. 5 presents a plot of the molecular weight distributions of the polymers of Examples 85-92.

Generally, high molecular weight polymers with broad MWD's were produced, and the catalyst system was not very responsive to hydrogen. Unexpectedly, the polymer of Example 90 had a distinct bimodal MWD; the catalyst system contained FSCA in addition to the MET 3 metallocene compound and the supported Ziegler catalyst. Table VIII summarizes the molecular weight characterization of Examples 85-92, and demonstrates a wide range of polymer weights (generally high molecular weights and broad molecular weight distributions) that can be produced with different metallocene compounds and dual catalyst systems. FIG. 5 illustrates the molecular weight distributions of the polymers of Examples 85-92. Although not tested, it was expected that the polymers of Examples 85-92 would have low levels of long chain branches (LCB), with typically less than 0.005 LCB per 1000 total carbon atoms, and substantially flat short chain branching distributions.

TABLE I

Examples 1-19.

| Example No. | Catalyst | Time (Min) | Temp. (C.) | Ethylene (psig) | $H_2$ (ppm) | Comonomer Type |
|---|---|---|---|---|---|---|
| 1 | Supported | 30 | 90 | 450 | 0 | 1-hexene |
| 2 | Supported | 30 | 90 | 390 | 100 ppm | 1-hexene |
| 3 | Supported | 30 | 90 | 390 | 200 ppm | 1-hexene |
| 4 | Supported | 30 | 90 | 390 | 300 ppm | 1-hexene |
| 5 | Supported | 30 | 90 | 390 | 400 ppm | 1-hexene |
| 6 | Supported | 30 | 90 | 390 | 1000 ppm | 1-hexene |
| 7 | Supported | 30 | 90 | 390 | 3000 ppm | 1-hexene |
| 8 | Supported | 30 | 90 | 390 | 5000 ppm | 1-hexene |
| 9 | Supported | 30 | 90 | 390 | 10,000 ppm | 1-hexene |
| 10 | Supported | 30 | 90 | 390 | 20,000 ppm | 1-hexene |
| 11 | Supported | 30 | 90 | 390 | 0 | 1-hexene |
| 12 | Supported | 30 | 90 | 390 | 0 | 1-hexene |
| 13 | Supported | 30 | 90 | 390 | 0 | 1-hexene |
| 14 | Supported | 30 | 90 | 390 | 0 | 1-hexene |
| 15 | Supported | 30 | 90 | 390 | 0 | 1-hexene |
| 16 | Supported | 30 | 90 | 390 | 0 | 1-hexene |
| 17 | Supported | 30 | 90 | 390 | 355 ppm | 1-hexene |
| 18 | Dual | 30 | 90 | 390 | 0 | 1-hexene |
| 19 | Dual | 30 | 90 | 390 | 880 ppm | 1-hexene |

TABLE I-continued

Examples 1-19.

| Example No. | Comonomer Weight (g) | Catalyst. Weight (g) | Polymer (g) | Productivity (g/g) | Activity (g/g/hr) | MI | HLMI |
|---|---|---|---|---|---|---|---|
| 1 | 0 | 0.0142 | 188.1 | 13246 | 26493 | 0 | 0 |
| 2 | 0 | 0.0201 | 237.3 | 11806 | 23612 | 0 | 0 |
| 3 | 0 | 0.0154 | 135.9 | 8825 | 17649 | 0 | 0 |
| 4 | 0 | 0.0124 | 95.6 | 7710 | 15419 | 0 | 0 |
| 5 | 0 | 0.0065 | 65.0 | 7647 | 15294 | 0 | 0 |
| 6 | 0 | 0.0122 | 66.0 | 5410 | 10820 | 0 | 0.05 |
| 7 | 0 | 0.0169 | 69.2 | 4095 | 8189 | 0 | 0 |
| 8 | 0 | 0.0170 | 60.0 | 3529 | 7059 | 0 | 0.06 |
| 9 | 0 | 0.0196 | 93.8 | 4786 | 9571 | 0 | 0 |
| 10 | 0 | 0.0211 | 102.2 | 4844 | 9687 | 0 | 0 |
| 11 | 15 | 0.0082 | 99.0 | 12073 | 24146 | 0 | 0 |
| 12 | 23 | 0.0102 | 106.8 | 10373 | 20745 | 0 | 0 |
| 13 | 23.4 | 0.0134 | 291.4 | 16373 | 32746 | 0 | 0 |
| 14 | 58.8 | 0.0100 | 134.0 | 13400 | 26800 | 0 | 0 |
| 15 | 54 | 0.0078 | 120.1 | 15397 | 30795 | 0 | 0 |
| 16 | 75 | 0.0130 | 175.9 | 13531 | 27062 | 0 | 0 |
| 17 | 0 | 0.0100 | 22.9 | 2290 | 4580 | 0.02 | 3.70 |
| 18 | 40 | 0.0119 | 293.9 | 24697 | 49395 | 0 | 0.71 |
| 19 | 40 | 0.0045 | 101.0 | 22444 | 44889 | 0.42 | 16.95 |

TABLE II

Examples 20-26.

| Example | Catalyst | Catalyst (mg) | Ethylene (psig) | $H_2$ (ppm) | Comonomer Type | Comonomer. Weight (g) |
|---|---|---|---|---|---|---|
| 20 | MET 1/Supported | 0.5/7.4 | 390 | 0 | 1-hexene | 40 |
| 21 | MET 1/Supported | 0.5/16.8 | 390 | 200 | 1-hexene | 40 |
| 22 | MET 1/Supported | 0.5/13.1 | 390 | 880 | 1-hexene | 26 |
| 23 | Supported | | 450 | 0 | 1-hexene | 0 |
| 24 | Supported/MET 1 | 11.0/0.5 | 450 | 0 | 1-hexene | 0 |
| 25 | Supported/MET 1 | 31.9/0.5 | 450 | 0 | 1-hexene | 0 |
| 26 | Supported/MET 1 | 7.8/0.5 | 450 | 0 | 1-hexene | 0 |

| Example | TIBA (mmol) | TEA (mmol) | Catalyst Weight (g) | Polymer (g) | Productivity (g/g) | Activity (g/g/hr) | MI | HLMI |
|---|---|---|---|---|---|---|---|---|
| 20 | 0.4 | 0 | 0.0079 | 111.3 | 14089 | 28177 | 0 | 0 |
| 21 | 0.4 | 0 | 0.0173 | 144.0 | 8324 | 16647 | 0 | 0 |
| 22 | 0.4 | 0 | 0.0136 | 66.0 | 4853 | 9706 | 0 | 4.4 |
| 23 | 0 | 1 | 0.0146 | 149.0 | 10205 | 20411 | 0 | 0 |
| 24 | 0 | 1 | 0.0115 | 197.5 | 17174 | 34348 | 0 | 0 |
| 25 | 0 | 1 | 0.0324 | 94.4 | 2914 | 5827 | 0 | 0 |
| 26 | 0 | 1 | 0.0083 | 124.9 | 15048 | 30096 | 0 | 0 |

TABLE III

Examples 20-23 - Molecular weight characterization (molecular weights in g/mol)

| Example | Mn/1000 | Mw/1000 | Mz/1000 | Mv/1000 | Mp/1000 | Mw/Mn | IB | IVc | Mz/Mw |
|---|---|---|---|---|---|---|---|---|---|
| 20 | 139 | 1065 | 3260 | 860 | 558 | 7.67 | 1.56 | 8.04 | 3.06 |
| 21 | 171 | 772 | 2413 | 640 | 462 | 4.52 | 1.29 | 6.48 | 3.13 |
| 22 | 53 | 227 | 671 | 192 | 105 | 4.29 | 1.33 | 2.70 | 2.95 |
| 23 | 283 | 1406 | 3450 | 1192 | 713 | 4.98 | 1.31 | 10.18 | 2.45 |

TABLE IV

Examples 27-41

| Example | Catalyst System | Catalyst Weight (g) | $H_2$ (Δppm) | Time (min) | Polymer (g) | Ti in PE (ppm) |
|---|---|---|---|---|---|---|
| 27 | SA/MgCl$_2$/TiCl$_4$ | 0.157 | | 60 | 296 | |
| 28 | SA/MgCl$_2$/IndTiCl$_3$ | 0.133 | | 60 | 11 | |
| 29 | FSCA/MgCl$_2$/TiCl$_4$ | 0.1 | | 60 | 527 | 1.3 |

TABLE IV-continued

Examples 27-41

| | | | | | |
|---|---|---|---|---|---|
| 30 | FSCA/MgCl$_2$/ZrCl$_4$ | 0.1 | | 30 | 7 |
| 31 | FSCA/MgCl$_2$/TiCl$_4$ | 0.05 | | 30 | 142 | 2.5 |
| 32 | FSCA/MgCl$_2$/CpTiCl$_3$ | 0.1 | | 60 | 285 |
| 32 | FSCA/MgCl$_2$/((CH$_3$)CHO)TiCl$_3$ | 0.1 | | 30 | 133 |
| 34 | FSCA/MgCl$_2$/Cp * CrCl$_3$(Py)$_2$ | 0.1 | | 30 | 1.2 |
| 35 | FSCA/MgCl$_2$/V(O)Cl$_3$ | 0.1 | | 30 | 132 |
| 36 | FSCA/TiCl$_4$ | 0.1 | | 30 | 16 |
| 37 | FSCA/CpTiCl$_3$ | 0.2 | | 60 | 148 |
| 38 | FSCA/MgCl$_2$ | 0.1 | | 30 | 0 |
| 39 | FSCA/V(O)Cl$_3$ | 0.1 | | 30 | 3.5 |
| 40 | FSCA + MET 1 | 0.05/0.0005 | 100 | 30 | 201 |
| 41 | (FSCA/MgCl$_2$/TiCl$_4$) + MET 1 | 0.05/0.0005 | 100 | 30 | 375 |

| Example | Activity (g/g/hr) | MI | HLMI | Density | Mn/1000 | Mw/1000 | Mz/1000 |
|---|---|---|---|---|---|---|---|
| 27 | 1885 | Too low | 2.3 | | 313 | 1276 | 2963 |
| 28 | 83 | Too low | Too low | | 227 | 963 | 2631 |
| 29 | 5270 | Too low | Too low | | | | |
| 30 | 140 | Too low | Too low | | | | |
| 31 | 5680 | Too low | 21 | | 202 | 1056 | 2777 |
| 32 | 2850 | Too low | 18 | 0.9416 | 224 | 999 | 2682 |
| 33 | 2660 | Too low | Too low | | 137 | 777 | 2400 |
| 34 | 24 | Too low | Too low | | | | |
| 35 | 2640 | Too low | 25 | | 1009 | 2417 | 3849 |
| 36 | 320 | Too low | 19 | | 165 | 1746 | 3734 |
| 37 | 740 | 0.1 | 69 | 0.9481 | 19 | 170 | 1868 |
| 38 | 0 | | | | | | |
| 39 | 70 | | | | | | |
| 40 | 8040 | | | | | | |
| 41 | 15,000 | | | | | | |

TABLE V

Examples 42-54 - Molecular weight characterization (molecular weights in g/mol).

| Example | Catalyst System | Mn/1000 | Mw/1000 | Mz/1000 | Mv/1000 | Mp/1000 |
|---|---|---|---|---|---|---|
| 42 | FSCA/MgCl$_2$/TiCl$_4$ | 137 | 652 | 1928 | 550 | 476 |
| 43 | FSCA/MgCl$_2$/CpTiCl$_3$ | 123 | 860 | 2300 | 726 | 553 |
| 44 | FSCA/MgCl$_2$/CpTiCl$_3$ | 197 | 1022 | 2654 | 864 | 533 |
| 45 | FSCA/MgCl$_2$/Ti(OCH(CH$_3$)$_2$)$_2$Cl$_2$ | 137 | 777 | 2400 | 642 | 535 |
| 46 | FSCA/MgCl$_2$/TiCl$_4$ | 231 | 942 | 2489 | 798 | 535 |
| 47 | FSCA/MgCl$_2$/TiCl$_4$ | 392 | 1399 | 3070 | 1215 | 654 |
| 48 | FSCA/MgCl$_2$/TiCl$_4$ | 345 | 1621 | 3319 | 1414 | 943 |
| 49 | FSCA/MgCl$_2$/TiCl$_4$ | 308 | 1681 | 3473 | 1457 | 1044 |
| 50 | FSCA/MgCl$_2$/TiCl$_4$ | 51 | 258 | 729 | 218 | 153 |
| 51 | FSCA/MgCl$_2$/TiCl$_4$ | 41 | 185 | 467 | 158 | 112 |
| 52 | FSCA/MgCl$_2$/TiCl$_4$ | 84 | 680 | 2429 | 541 | 386 |
| 53 | FSCA/MgCl$_2$/TiCl$_4$ | 75 | 294 | 912 | 248 | 150 |
| 54 | FSCA/MgCl$_2$/TiCl$_4$ | 38 | 165 | 448 | 141 | 92 |

| Example | Catalyst System | Mw/Mn | IB | IVc | Density | MI | HLMI |
|---|---|---|---|---|---|---|---|
| 42 | FSCA/MgCl$_2$/TiCl$_4$ | 4.76 | 1.19 | 5.81 | | | |
| 43 | FSCA/MgCl$_2$/CpTiCl$_3$ | 7.01 | 1.23 | 7.11 | 0.9351 | | 1.9 |
| 44 | FSCA/MgCl$_2$/CpTiCl$_3$ | 5.18 | 1.25 | 8.06 | 0.9417 | | 24 |
| 45 | FSCA/MgCl$_2$/Ti(OCH(CH$_3$)$_2$)$_2$Cl$_2$ | 5.69 | 1.30 | 6.50 | | | 19 |
| 46 | FSCA/MgCl$_2$/TiCl$_4$ | 4.09 | 1.21 | 7.61 | | | 3 |
| 47 | FSCA/MgCl$_2$/TiCl$_4$ | 3.56 | 1.25 | 10.33 | | | |
| 48 | FSCA/MgCl$_2$/TiCl$_4$ | 4.71 | 1.35 | 11.53 | | | |
| 49 | FSCA/MgCl$_2$/TiCl$_4$ | 5.45 | 1.46 | 11.79 | | | |
| 50 | FSCA/MgCl$_2$/TiCl$_4$ | 5.04 | 1.33 | 2.97 | | | 1.8 |
| 51 | FSCA/MgCl$_2$/TiCl$_4$ | 4.52 | 1.29 | 2.35 | | 0.20 | 6.2 |
| 52 | FSCA/MgCl$_2$/TiCl$_4$ | 8.09 | 1.52 | 5.74 | 0.9434 | | |
| 53 | FSCA/MgCl$_2$/TiCl$_4$ | 3.95 | 1.30 | 3.26 | 0.9427 | | 1.1 |
| 54 | FSCA/MgCl$_2$/TiCl$_4$ | 4.39 | 1.25 | 2.16 | 0.9435 | 0.34 | 11.5 |

TABLE VI

Examples 55-83 - Molecular weight characterization (molecular weights in g/mol).

| Example | Catalyst System | Mn/1000 | Mw/1000 | Mz/1000 | Mv/1000 | Mp/1000 |
|---|---|---|---|---|---|---|
| 55 | (FSCA/MgCl$_2$/CpTi) + MET 2 | 210 | 831 | 2296 | 702 | 490 |
| 56 | (FSCA/MgCl$_2$/CpTi) + MET 2 | 209 | 907 | 2506 | 763 | 494 |
| 57 | (FSCA/MgCl$_2$/CpTi) + MET 2 | 213 | 1012 | 2765 | 846 | 605 |
| 58 | (FSCA/MgCl$_2$/CpTi) + MET 1 | 206 | 983 | 2637 | 825 | 533 |
| 59 | (FSCA/MgCl$_2$/CpTi) + MET 1 | 179 | 935 | 2700 | 775 | 520 |
| 60 | (FSCA/MgCl$_2$/TiCl$_4$) + MET 2 | 131 | 550 | 1640 | 463 | 404 |
| 61 | (FSCA/MgCl$_2$/TiCl$_4$) + MET 1 | 138 | 497 | 1369 | 425 | 394 |
| 62 | (FSCA/MgCl$_2$/V(O)Cl$_3$) + MET 2 | 1057 | 2375 | 3827 | 2183 | 2750 |
| 63 | (FSCA/MgCl$_2$/V(O)Cl$_3$) + MET 2 | 581 | 1745 | 3438 | 1543 | 874 |
| 64 | (FSCA/TiCl$_4$) + MET 1 | 292 | 1094 | 2764 | 934 | 535 |
| 65 | (FSCA/TiCl$_4$) + MET 1 | 74 | 262 | 700 | 226 | 146 |
| 66 | (FSCA/TiCl$_4$) + MET 1 | 78 | 244 | 557 | 213 | 139 |
| 67 | (FSCA/TiCl$_4$) + MET 1 | 51 | 180 | 401 | 158 | 121 |
| 68 | (FSCA/TiCl$_4$) + MET 1 | 264 | 1015 | 2696 | 862 | 584 |
| 69 | (FSCA/TiCl$_4$) + MET 1 | 64 | 230 | 557 | 199 | 135 |
| 70 | (FSCA/TiCl$_4$) + MET 1 | 73 | 247 | 619 | 214 | 159 |
| 71 | (FSCA/TiCl$_4$) + MET 1 | 66 | 224 | 518 | 196 | 135 |
| 72 | (FSCA/MgCl$_2$/TiCl$_4$) + MET 3 | 174 | 812 | 2342 | 678 | 490 |
| 73 | (FSCA/MgCl$_2$/TiCl$_4$) + MET 3 | 62 | 234 | 588 | 201 | 134 |
| 74 | (FSCA/MgCl$_2$/TiCl$_4$) + MET 3 | 47 | 222 | 608 | 188 | 139 |
| 75 | (FSCA/MgCl$_2$/TiCl$_4$) + MET 3 | 43 | 226 | 584 | 193 | 132 |
| 76 | (FSCA/MgCl$_2$/TiCl$_4$) + MET 3 | 84 | 761 | 2388 | 621 | 502 |
| 77 | (FSCA/MgCl$_2$/TiCl$_4$) + MET 3 | 66 | 209 | 471 | 183 | 141 |
| 78 | (FSCA/MgCl$_2$/TiCl$_4$) + MET 3 | 69 | 250 | 617 | 216 | 151 |
| 79 | (FSCA/MgCl$_2$/TiCl$_4$) + MET 3 | 50 | 214 | 524 | 185 | 142 |
| 80 | (FSCA/MgCl$_2$/TiCl$_4$) + MET 3 | 29 | 179 | 488 | 152 | 121 |
| 81 | (FSCA/MgCl$_2$/TiCl$_4$) + MET 3 | 37 | 192 | 546 | 163 | 122 |
| 82 | (FSCA/MgCl$_2$/TiCl$_4$) + MET 3 | 46 | 183 | 463 | 158 | 118 |
| 83 | FSCA + MET3 | 14 | 50 | 120 | 44 | 42 |

| Example | Mw/Mn | IB | IVc | MI | HLMI |
|---|---|---|---|---|---|
| 55 | 3.96 | 1.19 | 6.93 | | |
| 56 | 4.33 | 1.23 | 7.36 | | |
| 57 | 4.76 | 1.32 | 7.94 | | 9 |
| 58 | 4.77 | 1.27 | 7.80 | | |
| 59 | 5.23 | 1.33 | 7.45 | | |
| 60 | 4.18 | 1.27 | 5.12 | | 0.4 |
| 61 | 3.60 | 1.21 | 4.82 | | 0.9 |
| 62 | 2.25 | 1.07 | 15.81 | | |
| 63 | 3.00 | 1.24 | 12.28 | | |
| 64 | 3.75 | 1.18 | 8.53 | | |
| 65 | 3.57 | 1.26 | 3.04 | | |
| 66 | 3.12 | 1.24 | 2.92 | | |
| 67 | 3.54 | 1.18 | 2.35 | | |
| 68 | 3.85 | 1.18 | 8.05 | | |
| 69 | 3.60 | 1.25 | 2.78 | | |
| 70 | 3.39 | 1.25 | 2.93 | | |
| 71 | 3.39 | 1.22 | 2.74 | | |
| 72 | 4.66 | 1.27 | 6.76 | | |
| 73 | 3.78 | 1.27 | 2.80 | | |
| 74 | 4.71 | 1.32 | 2.67 | | |
| 75 | 5.20 | 1.32 | 2.71 | | |
| 76 | 9.06 | 1.37 | 6.34 | | |
| 77 | 3.15 | 1.21 | 2.61 | | |
| 78 | 3.61 | 1.29 | 2.94 | | |
| 79 | 4.31 | 1.27 | 2.63 | | |
| 80 | 6.27 | 1.31 | 2.28 | 0.22 | 6.9 |
| 81 | 5.19 | 1.27 | 2.40 | 0.21 | 5.8 |
| 82 | 4.01 | 1.24 | 2.35 | 0.21 | 6.3 |
| 83 | 3.57 | 1.24 | 0.93 | | |

TABLE VII

Examples 85-92.

| Example | Catalyst | Catalyst (mg) | Ethylene (psig) | H$_2$ (ppm) | Comonomer Type | Comonomer. Weight (g) |
|---|---|---|---|---|---|---|
| 85 | MET 3/Supported | 2/12.1 | 390 | 100 | 1-hexene | 5 |
| 86 | MET 3/Supported | 2/9.1 | 390 | 200 | 1-hexene | 50 |
| 87 | MET 3/Supported | 2/10.8 | 390 | 1000 | 1-hexene | 5 |
| 88 | MET 3/Supported | 2/9.8 | 390 | 10000 | 1-hexene | 5 |

TABLE VII-continued

Examples 85-92.

| | | | | | | | |
|---|---|---|---|---|---|---|---|
| 89 | MET 3/Supported/FSCA | 2/5.9/120 | 390 | 100 | 1-hexene | | 5 |
| 90 | MET 3/Supported/FSCA | 2/1.2/142 | 390 | 10 | 1-hexene | | 5 |
| 91 | MET 2/Supported | 1/13.3 | 390 | 100 | 1-hexene | | 5 |
| 92 | MET 2/Supported | 1/6.3 | 390 | 100 | 1-hexene | | 50 |

| Example | TIBA (mmol) | Catalyst Weight (g) | Polymer (g) | Productivity (g/g) | Activity (g/g/hr) | MI | HLMI |
|---|---|---|---|---|---|---|---|
| 85 | 0.8 | 0.0141 | 168 | 11914 | 23828 | 0 | 0 |
| 86 | 0.8 | 0.0111 | 245 | 22072 | 44144 | 0 | 0 |
| 87 | 0.8 | 0.0128 | 119 | 9297 | 18594 | 0 | 0 |
| 88 | 0.8 | 0.0118 | 106 | 8983 | 17966 | 0 | 0 |
| 89 | 0.8 | 0.0079 | 212 | 26835 | 53671 | 0.63 | 50.9 |
| 90 | 0.8 | 0.0120 | 240 | 20000 | 20000 | 2.20 | 320.2 |
| 91 | 0.8 | 0.0143 | 168 | 11748 | 23496 | 0 | 0 |
| 92 | 0.8 | 0.0073 | 45 | 6164 | 12328 | 0 | 0 |

TABLE VIII

Examples 85-92 - Polymer properties (molecular weights in g/mol)

| Example | Mn/1000 | Mw/1000 | Mz/1000 | Mp/1000 | Mw/Mn | Density (g/cc) |
|---|---|---|---|---|---|---|
| 85 | 350 | 1565 | 3806 | 637 | 4.46 | 0.9411 |
| 86 | 113 | 1085 | 3634 | 514 | 9.57 | 0.9349 |
| 87 | 116 | 1010 | 3266 | 534 | 8.70 | 0.9317 |
| 88 | 66 | 752 | 3094 | 430 | 11.46 | 0.9467 |
| 89 | 33 | 1374 | 4305 | 843 | 42.22 | 0.9502 |
| 90 | 13 | 138 | 1073 | 32 | 10.57 | 0.9583 |
| 91 | 161 | 1285 | 3699 | 622 | 7.97 | 0.9391 |
| 92 | 55 | 812 | 3921 | 93 | 14.63 | 0.9277 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

A process to produce a supported catalyst, the process comprising:
(i) contacting:
(a) a fluorided silica-coated alumina;
(b) a magnesium compound; and
(c) a titanium (IV) compound and/or vanadium compound; and
(ii) forming the supported catalyst.

Embodiment 2

The process defined in embodiment 1, wherein step (i) comprises contacting the fluorided silica-coated alumina, the magnesium compound, and the titanium (IV) compound and/or vanadium compound in a solvent.

Embodiment 3

The process defined in embodiment 1, wherein step (i) comprises contacting the fluorided silica-coated alumina and the magnesium compound in a solvent to form a mixture (e.g., a slurry), and then contacting the mixture with the titanium (IV) compound and/or vanadium compound.

Embodiment 4

The process defined in embodiment 1, wherein step (i) comprises contacting a mixture (e.g., a solution) of the magnesium compound and the titanium (IV) compound and/or vanadium compound in a solvent with the fluorided silica-coated alumina.

Embodiment 5

The process defined in any one of embodiments 2-4, wherein the solvent is any suitable non-polar solvent or any non-polar solvent disclosed herein, e.g., aromatic hydrocarbons (e.g., toluene), alkanes (e.g., heptane), chlorinated hydrocarbons (e.g., chlorobenzene), etc., as well as combinations thereof.

Embodiment 6

The process defined in any one of embodiments 2-4, wherein the solvent is any suitable polar aprotic solvent or any polar aprotic solvent disclosed herein, e.g., ethers, pyridines, THF, substituted THF, dimethoxyethane, 1,4-dioxane, etc., as well as combinations thereof.

Embodiment 7

The process defined in any one of embodiments 2-4, wherein the solvent is any suitable Lewis base or any Lewis base disclosed herein, e.g., ethers, pyridines, THF, substituted THF, dimethoxyethane, 1,4-dioxane, etc., as well as combinations thereof.

Embodiment 8

The process defined in any one of the preceding embodiments, wherein step (i) is conducted for any suitable time period or in any range of time periods disclosed herein, e.g., from about 5 seconds to about 48 hours, from about 1 minute to about 18 hours, etc.

Embodiment 9

The process defined in any one of the preceding embodiments, wherein step (i) is conducted at any suitable temperature or in any temperature range disclosed herein, e.g., from about 0° C. to about 100° C., from about 10° C. to about 90° C., etc.

Embodiment 10

The process defined in any one of the preceding embodiments, wherein step (ii) comprises filtering and/or washing the product of step (i).

Embodiment 11

The process defined in any one of the preceding embodiments, wherein step (ii) comprises drying the product of step (i) to form the supported catalyst, e.g., under reduced pressure.

Embodiment 12

A supported catalyst produced by the process defined in any one of the preceding embodiments.

Embodiment 13

A supported catalyst comprising:
(a) a fluorided silica-coated alumina;
(b) a magnesium compound; and
(c) titanium (IV) and/or vanadium.

Embodiment 14

The process or catalyst defined in any one of the preceding embodiments, wherein the fluorided silica-coated alumina comprises silica in any suitable amount or in any range of weight percentages disclosed herein, e.g., from about 10 to about 80 wt. % silica, from about 20 to about 70 wt. % silica, from about 25 to about 50 wt. % silica, etc., based on the weight of the fluorided silica-coated alumina.

Embodiment 15

The process or catalyst defined in any one of the preceding embodiments, wherein the weight percentage of F, based on the weight of the fluorided silica-coated alumina, is any suitable amount or in any range of weight percentages disclosed herein, e.g., from about 1 to about 20 wt. %, from about 2 to about 15 wt. %, from about 3 to about 12 wt. %, etc.

Embodiment 16

The process or catalyst defined in any one of the preceding embodiments, wherein a weight percentage of magnesium, based on the weight of the catalyst, is any suitable amount or in any weight percentage range disclosed herein, e.g., from about 0.1 to about 10 wt. %, from about 0.25 to about 8 wt. %, from about 0.5 to about 7 wt. %, from about 0.5 to about 3 wt. %, etc.

Embodiment 17

The process or catalyst defined in any one of the preceding embodiments, wherein a weight percentage of titanium (or vanadium), based on the weight of the catalyst, is any suitable amount or in any weight percentage range disclosed herein, e.g., from about 0.1 to about 10 wt. %, from about 0.2 to about 5 wt. %, from about 0.3 to about 2 wt. %, etc.

Embodiment 18

The process or catalyst defined in any one of embodiments 1-17, wherein the magnesium compound comprises any suitable inorganic magnesium compound or any inorganic magnesium compound disclosed herein, e.g., $MgCl_2$, $MgBr_2$, $MgI_2$, $MgSO_4$, $Mg(NO_3)_2$, etc., as well as combinations thereof.

Embodiment 19

The process or catalyst defined in any one of embodiments 1-17, wherein the magnesium compound comprises any suitable magnesium alkoxide compound or any magnesium alkoxide compound disclosed herein, e.g., magnesium methoxide, magnesium ethoxide, etc., as well as combinations thereof.

Embodiment 20

The process or catalyst defined in any one of the preceding embodiments, wherein the magnesium compound comprises any suitable magnesium compound that is not a reducing agent (e.g., Grignard reagents such as butyl magnesium bromide; dibutyl magnesium; cyclopentadienyl magnesium, etc.).

Embodiment 21

The process or catalyst defined in any one of the preceding embodiments, wherein the titanium (IV) compound used in the process (or the titanium (IV) species present on the catalyst) comprises any suitable titanium compound or any titanium compound disclosed herein, e.g., $TiCl_4$, $TiBr_4$, $TiI_4$, $TiF_4$, titanium alkoxides, etc., as well as combinations thereof.

Embodiment 22

The process or catalyst defined in any one of the preceding embodiments, wherein the vanadium compound used in the process (or the vanadium species present on the catalyst) comprises any suitable vanadium compound (e.g., V(III), V(IV), V(V)) or any vanadium compound disclosed herein, e.g., vanadium halides, $VCl_3$, $VCl_4$, $VOCl_3$, vanadium alkoxides, etc., as well as combinations thereof.

Embodiment 23

The process or catalyst defined in any one of the preceding embodiments, wherein the catalyst is substantially free of Ti (III), e.g., less than 500 ppm, less than 100 ppm, less than 10 ppm, etc., by weight.

Embodiment 24

The process or catalyst defined in any one of the preceding embodiments, wherein the catalyst further comprises any suitable polar aprotic solvent or any polar aprotic solvent disclosed herein, e.g., ethers, pyridines, THF, substituted THF, dimethoxyethane, 1,4-dioxane, etc., as well as combinations thereof, at an amount in any range disclosed herein, e.g., from about 1 to about 500 ppm, from about 1 to about 50 ppm, from about 1 to about 10 ppm, etc., based on the weight of the supported catalyst.

Embodiment 25

A catalyst composition comprising the supported catalyst defined in any one of embodiments 12-24 and any suitable co-catalyst or any co-catalyst disclosed herein.

Embodiment 26

The composition defined in embodiment 25, wherein the catalyst composition comprises an aluminoxane co-catalyst, an organoaluminum co-catalyst, an organoboron co-catalyst, or any combination thereof.

Embodiment 27

The composition defined in embodiment 25, wherein the catalyst composition comprises an organoaluminum co-catalyst comprising trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 28

The composition defined in any one of embodiments 25-27, wherein the weight ratio of the co-catalyst to the supported catalyst is any suitable weight ratio or in any range disclosed herein, e.g., from about 10:1 to about 1:1000, from about 3:1 to about 1:100, from about 1:1 to about 1:50, etc.

Embodiment 29

The composition defined in any one of embodiments 25-28, wherein the catalyst composition has a catalyst activity in any range of catalyst activities disclosed herein, e.g., greater than about 2,000 g/g/hr, greater than about 3,000 g/g/hr, greater than about 5,000 g/g/hr, greater than about 10,000 g/g/hr, etc.

Embodiment 30

The composition defined in any one of embodiments 25-29, wherein the catalyst composition is substantially free of aluminoxane compounds, organoboron or organoborate compounds, ionizing ionic compounds, or combinations thereof.

Embodiment 31

An olefin polymerization process, the process comprising contacting the catalyst composition defined in any one of embodiments 25-30 with an olefin monomer and an optional olefin comonomer in a polymerization reactor system under polymerization conditions to produce an olefin polymer.

Embodiment 32

The process defined in embodiment 31, wherein the olefin monomer comprises any olefin monomer disclosed herein, e.g., any $C_2$-$C_{20}$ olefin.

Embodiment 33

The process defined in embodiment 31 or 32, wherein the olefin monomer and the optional olefin comonomer independently comprise a $C_2$-$C_{20}$ alpha-olefin.

Embodiment 34

The process defined in any one of embodiments 31-33, wherein the olefin monomer comprises ethylene.

Embodiment 35

The process defined in any one of embodiments 31-34, wherein the catalyst composition is contacted with ethylene and an olefin comonomer comprising a $C_3$-$C_{10}$ alpha-olefin.

Embodiment 36

The process defined in any one of embodiments 31-35, wherein the catalyst composition is contacted with ethylene and an olefin comonomer comprising 1-butene, 1-hexene, 1-octene, or a mixture thereof.

Embodiment 37

The process defined in any one of embodiments 31-33, wherein the olefin monomer comprises propylene.

Embodiment 38

The process defined in any one of embodiments 31-37, wherein the polymerization reactor system comprises a batch reactor, a slurry reactor, a gas-phase reactor, a solution reactor, a high pressure reactor, a tubular reactor, an autoclave reactor, or a combination thereof.

Embodiment 39

The process defined in any one of embodiments 31-38, wherein the polymerization reactor system comprises a slurry reactor, a gas-phase reactor, a solution reactor, or a combination thereof.

Embodiment 40

The process defined in any one of embodiments 31-39, wherein the polymerization reactor system comprises a loop slurry reactor.

Embodiment 41

The process defined in any one of embodiments 31-40, wherein the polymerization reactor system comprises a single reactor.

Embodiment 42

The process defined in any one of embodiments 31-40, wherein the polymerization reactor system comprises 2 reactors.

Embodiment 43

The process defined in any one of embodiments 31-40, wherein the polymerization reactor system comprises more than 2 reactors.

Embodiment 44

The process defined in any one of embodiments 31-43, wherein the olefin polymer comprises any olefin polymer disclosed herein.

Embodiment 45

The process defined in any one of embodiments 31-36 and 38-44, wherein the olefin polymer is an ethylene/1-butene copolymer, an ethylene/1-hexene copolymer, or an ethylene/1-octene copolymer.

Embodiment 46

The process defined in any one of embodiments 31-36 and 38-44, wherein the olefin polymer is an ethylene/1-hexene copolymer.

Embodiment 47

The process defined in any one of embodiments 31-33 and 37-44, wherein the olefin polymer is a polypropylene homopolymer or a propylene-based copolymer.

Embodiment 48

The process defined in any one of embodiments 31-47, wherein the polymerization conditions comprise a polymerization reaction temperature in a range from about 60° C. to about 120° C. and a reaction pressure in a range from about 200 to about 1000 psig (about 1.4 to about 6.9 MPa).

Embodiment 49

The process defined in any one of embodiments 31-48, wherein the polymerization conditions are substantially constant, e.g., for a particular polymer grade.

Embodiment 50

The process defined in any one of embodiments 31-49, wherein no hydrogen is added to the polymerization reactor system.

Embodiment 51

The process defined in any one of embodiments 31-49, wherein hydrogen is added to the polymerization reactor system.

Embodiment 52

The process defined in any one of embodiments 31-51, wherein the olefin polymer is characterized by any MI disclosed herein, and/or any HLMI disclosed herein, and/or any density disclosed herein, and/or any Mn disclosed herein, and/or any Mw disclosed herein, and/or any Mz disclosed herein, and/or any Mw/Mn disclosed herein, and/or any Mz/Mw disclosed herein.

Embodiment 53

The process defined in any one of embodiments 31-52, wherein the olefin polymer has less than about 0.01 long chain branches (LCB) per 1000 total carbon atoms, e.g., less than about 0.008 LCB, less than about 0.005 LCB, etc.

Embodiment 54

The process defined in any one of embodiments 31-53, wherein the olefin polymer has a substantially constant short chain branch distribution (SCBD), as determined by any procedure disclosed herein.

Embodiment 55

An olefin polymer produced by the polymerization process defined in any one of embodiments 31-54.

Embodiment 56

An article comprising the olefin polymer defined in Embodiment 55.

Embodiment 57

A method or forming or preparing an article of manufacture comprising an olefin polymer, the method comprising (i) performing the olefin polymerization process defined in any one of embodiments 31-54 to produce the olefin polymer, and (ii) forming the article of manufacture comprising the olefin polymer, e.g., via any technique disclosed herein.

Embodiment 58

The article defined in embodiment 56 or 57, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

We claim:

1. A process to produce a supported catalyst, the process comprising:
   (i) contacting:
      (a) a fluorided silica-coated alumina;
      (b) a magnesium compound; and
      (c) a titanium (IV) compound and/or vanadium compound; and
   (ii) forming the supported catalyst.

2. The process of claim 1, wherein step (i) is conducted in a non-polar solvent.

3. The process of claim 1, wherein step (i) is conducted in a polar aprotic solvent.

4. The process of claim 1, wherein the fluorided silica-coated alumina comprises from about 20 to about 45 wt. % silica and from about 2 to about 15 wt. % fluorine.

5. The process of claim 1, wherein the supported catalyst comprises from about 0.5 to about 7 wt. % magnesium.

6. The process of claim 5, wherein the magnesium compound is not a reducing agent.

7. The process of claim 1, wherein the supported catalyst comprises from about 0.5 to about 10 wt. % titanium.

8. The process of claim 7, wherein the supported catalyst is substantially free of Ti(III).

9. A catalyst composition comprising a co-catalyst and a supported catalyst comprising:
   (a) a fluorided silica-coated alumina;
   (b) a magnesium compound; and
   (c) titanium (IV) and/or vanadium.

10. The composition of claim 9, wherein:
   the fluorided silica-coated alumina comprises from about 20 to about 45 wt. % silica and from about 3 to about 12 wt. % fluorine;

the supported catalyst comprises from about 0.5 to about 3 wt. % magnesium, and the magnesium compound is not a reducing agent; and the supported catalyst comprises from about 0.5 to about 10 wt. % titanium, and the supported catalyst is substantially free of Ti(III).

11. The composition of claim 10, wherein the supported catalyst comprises a titanium (IV) compound comprising a titanium halide, a titanium alkoxide, an alkoxytitanium halide, or a combination thereof.

12. The composition of claim 9, wherein the supported catalyst comprises a magnesium halide, a magnesium alkoxide, an alkoxymagnesium halide, or a combination thereof.

13. The composition of claim 9, wherein the supported catalyst further comprises from about 1 to about 50 ppm THF by weight.

14. The composition of claim 9, wherein a weight ratio of the co-catalyst to the supported catalyst is in a range from about 3:1 to about 1:100.

15. The composition of claim 9, wherein the catalyst composition has a catalyst activity greater than about 2,000 g/g/hr, under slurry polymerization conditions, with a tri-isobutylaluminum co-catalyst, using isobutane as the diluent, at a polymerization temperature of 90° C. and a reactor pressure of 400 psig.

16. An olefin polymerization process, the process comprising contacting the catalyst composition of claim 9 with an olefin monomer and an optional olefin comonomer in a polymerization reactor system under polymerization conditions to produce an olefin polymer.

17. The process of claim 16, wherein the catalyst composition is contacted with ethylene and an olefin comonomer comprising 1-butene, 1-hexene, 1-octene, or a mixture thereof.

18. The process of claim 16, wherein the polymerization reactor system comprises a slurry reactor, a gas-phase reactor, a solution reactor, or a combination thereof.

19. The process of claim 16, wherein the olefin polymer is an ethylene/alpha-olefin copolymer.

20. The process of claim 19, wherein the ethylene/alpha-olefin copolymer has less than about 0.005 long chain branches per 1000 total carbon atoms and/or has a substantially constant short chain branch distribution.

* * * * *